(12) United States Patent
Landman

(10) Patent No.: US 12,182,295 B2
(45) Date of Patent: *Dec. 31, 2024

(54) METADATA STORAGE ARCHITECTURE AND DATA AGGREGATION

(71) Applicant: JFrog Ltd., Netanya (IL)

(72) Inventor: Yoav Landman, Netanya (IL)

(73) Assignee: JFrog Ltd., Netanya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/681,074

(22) Filed: Feb. 25, 2022

(65) Prior Publication Data

US 2022/0237315 A1 Jul. 28, 2022

Related U.S. Application Data

(63) Continuation of application No. 16/945,478, filed on Jul. 31, 2020, now Pat. No. 11,288,395.

(Continued)

(51) Int. Cl.
*G06F 16/245* (2019.01)
*G06F 8/77* (2018.01)
(Continued)

(52) U.S. Cl.
CPC ............ *G06F 21/6227* (2013.01); *G06F 8/77* (2013.01); *G06F 16/212* (2019.01);
(Continued)

(58) Field of Classification Search
CPC .............. G06F 16/245; G06F 16/2228; G06F 21/6227; G06F 16/212; G06F 16/258; G06F 8/77; G06Q 30/0185
See application file for complete search history.

(56) References Cited

U.S. PATENT DOCUMENTS 6,862,616 B1 * 3/2005 Tompkins ............... H04L 67/34
709/224
10,684,840 B1 * 6/2020 Hussain ................. H04L 67/30
(Continued)

OTHER PUBLICATIONS

Patent Cooperation Treaty, International Search Report and Written Opinion issued for PCT Application No. PCT/IB2020/000639, dated Jan. 4, 2021, 12 pages.

*Primary Examiner* — Alicia M Willoughby
(74) *Attorney, Agent, or Firm* — Norton Rose Fulbright US LLP

(57) ABSTRACT

The present disclosure is associated with operation of a metadata server for package management including development and deployment of software. To illustrate, a metadata server stores a database model including multiple data structures that each include one or more entries of multiple data objects and a set of mapping rules defining links between different data structures of the multiple data structure. A method of operating the metadata server includes determining access permissions for an entity. The access permissions correspond to authorization to access a set of the multiple data structures. The method further includes identifying and executing a mapping rule to authorize a link between two or more data structures. The method further includes accessing a portion of requested metadata from the two or more data structures that have an authorized active link, and providing an output of the portion of the requested metadata arranged according to an output format.

19 Claims, 10 Drawing Sheets

Related U.S. Application Data

(60) Provisional application No. 62/880,960, filed on Jul. 31, 2019.

(51) Int. Cl.
*G06F 16/21* (2019.01)
*G06F 16/22* (2019.01)
*G06F 16/25* (2019.01)
*G06F 21/62* (2013.01)
*G06Q 30/018* (2023.01)

(52) U.S. Cl.
CPC ........ *G06F 16/2228* (2019.01); *G06F 16/245* (2019.01); *G06F 16/258* (2019.01); *G06Q 30/0185* (2013.01)

(56) References Cited

U.S. PATENT DOCUMENTS

| | | | | |
|---|---|---|---|---|
| 2006/0253495 A1* | 11/2006 | Png | ........................ | G06F 16/283 |
| 2010/0205475 A1* | 8/2010 | Ebrahimi | ................ | G06F 21/62 715/764 |
| 2011/0296395 A1* | 12/2011 | Vidal | ...................... | G06F 8/658 717/176 |
| 2012/0036162 A1* | 2/2012 | Gimbel | ............... | G06F 16/2455 707/783 |
| 2012/0166976 A1* | 6/2012 | Rauh | ........................ | G06F 8/38 715/762 |
| 2012/0167157 A1* | 6/2012 | Walsh | ..................... | G06F 21/53 726/1 |
| 2013/0014080 A1* | 1/2013 | Brunswig | ............... | G06F 9/451 717/102 |
| 2014/0129550 A1* | 5/2014 | Weatherhead | ........ | G06F 16/248 707/723 |
| 2014/0172808 A1* | 6/2014 | Burge | ................... | G06F 21/604 707/694 |
| 2014/0173759 A1* | 6/2014 | Essary | ..................... | G06F 21/10 726/30 |
| 2014/0180961 A1* | 6/2014 | Hankins | .................... | G06F 8/71 705/348 |
| 2015/0268948 A1* | 9/2015 | Plate | ...................... | G06F 21/577 717/123 |
| 2016/0335454 A1* | 11/2016 | Choe | ..................... | G06Q 30/018 |
| 2017/0053130 A1* | 2/2017 | Hughes | .................. | G16H 10/60 |
| 2019/0087550 A1* | 3/2019 | Kim | ......................... | G06F 8/60 |
| 2020/0334277 A1* | 10/2020 | Doyle | ................... | G06F 16/289 |

\* cited by examiner

METADATA STORAGE ARCHITECTURE AND DATA AGGREGATION

CROSS-REFERENCE TO RELATED APPLICATIONS

The present application is a continuation of U.S. patent application Ser. No. 16/945,478 filed Jul. 31, 2020, and entitled "METADATA STORAGE ARCHITECTURE AND DATA AGGREGATION", which claims the benefit of U.S. Provisional Application No. 62/880,960 filed Jul. 31, 2019 and entitled "METADATA STORAGE ARCHITECTURE AND DATA AGGREGATION", the contents of which are incorporated by reference herein in their entirety.

TECHNICAL FIELD

The present application is generally related to the technical field of metadata storage, and more particularly, but not by way of limitation, to techniques for storing and linking metadata.

BACKGROUND

Computer systems and software have become an integral part of modern society and affect a variety of aspects of daily life. Software can be developed as a monolith, such as one piece of software, or as a service-oriented architecture where each piece of software provides a specific service and multiple pieces of software operate together. Software can be updated to add or remove functionality, to correct bugs (e.g., critical/functional issues), and/or to address security issues.

Development and deployment of software can involve generation and management of a variety of metadata for each stage of development and deployment. In addition, other metadata, such as metadata corresponding to user permissions, licenses, and vulnerabilities also needs to be generated, stored, maintained, managed, etc. The large amount of related metadata that needs to be tracked can create a variety of a data management and operational issues and challenges, such as the efficient and error free retrieval of data in real-time.

BRIEF SUMMARY

According to one embodiment, a method for operating a metadata server for package management including development or deployment of software is described. The method may be performed at a metadata server storing a database model including a plurality of data structures each including one or more entries of multiple data objects, a set of mapping rules defining links between different data structures of the plurality of data structure, and a set of operation rules for executing operations on the database model. The method includes receiving, by the one or more processors, a user identifier for an entity. The method includes determining, by the one or more processors based on the user identifier, access permissions for the entity, the access permissions corresponding to authorization to access a set of the plurality of data structures. The method further includes identifying, by the one or more processors, one or more mapping rules for execution based on the access permissions. The method also includes executing, by the one or more processors, the one or more mapping rules to authorize active links between multiple data structure of the plurality of data structures. The method further includes receiving, by the one or more processors, a request from the entity for metadata based on and related to a package and accessing, by the one or more processors, at least a portion of the requested metadata from the multiple data structures that have authorized active links. The method also includes providing, by the one or more processors, an output of the accessed at least a portion of the requested metadata to the entity, the output of the accessed at least a portion of the requested metadata arranged according to an output format.

According to yet another embodiment, a system for operating a metadata server for package management including development or deployment of software is described. The system includes at least one memory storing instructions and one or more processors coupled to the at least one memory. The at least one memory further stores a database model including a plurality of data structures each including one or more entries of multiple data objects, a set of mapping rules defining links between different data structures of the plurality of data structure, and a set of operation rules for executing operations on the database model. The one or more processors are configured to execute the instructions to cause the one or more processors to receive a user identifier for an entity and determine, based on the user identifier, access permissions for the entity, the access permissions corresponding to authorization to access a set of the plurality of data structures. The one or more processors can further be configured to execute the instructions to cause the one or more processors to identify one or more mapping rules for execution based on the access permissions. The one or more processors are further configured to execute the instructions to cause the one or more processors to execute the one or more mapping rules to authorize active links between multiple data structure of the plurality of data structures. The one or more processors are further configured to execute the instructions to cause the one or more processors to receive a request from the entity for metadata based on and related to a package and access at least a portion of the requested metadata from the multiple data structures that have authorized active links. The one or more processors can be further configured to provide an output of the accessed at least a portion of the requested metadata to the entity, the output of the accessed at least a portion of the requested metadata arranged according to an output format.

According to another embodiment, a computer program product is described that includes a computer-readable storage device, such as a non-transitory computer-readable storage medium, that includes instructions that, when executed by one or more processors, cause the one or more processors to perform operations for operating a metadata server for package management including development and deployment of software. The operations include executing a first routine to store a database model including a plurality of data structures each including one or more entries of multiple data objects, a set of mapping rules defining links between different data structures of the plurality of data structure, and a set of operation rules for executing operations on the data model. The operations further include executing a second routine to receive a user identifier for an entity. The operations also include executing a third routine to determine, based on the user identifier, access permissions for the entity, the access permissions corresponding to authorization to access a set of the plurality of data structures, executing a fourth routine to identify one or more mapping rules for execution based on the access permissions, and executing a fifth routine to execute the one or more mapping rules to authorize active links between multiple data structure of the plurality of data structures. The operations also include executing a sixth routine to receive a request from the entity for metadata based on and related to a package and executing a seventh routine to access at least a portion of the requested metadata from the multiple data structures that have authorized active links. The operations also include executing an eighth routine to provide an output of the accessed at least a portion of the requested metadata to the entity, the output of the accessed at least a portion of the requested metadata arranged according to an output format.

The foregoing has outlined rather broadly the features and technical advantages of the present disclosure in order that the detailed description that follows may be better understood. Additional features and advantages will be described hereinafter which form the subject of the claims of the present disclosure. It should be appreciated by those skilled in the art that the conception and specific implementations disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of the embodiments, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying figures, in which.

DETAILED DESCRIPTION OF THE INVENTION

Figure 1:
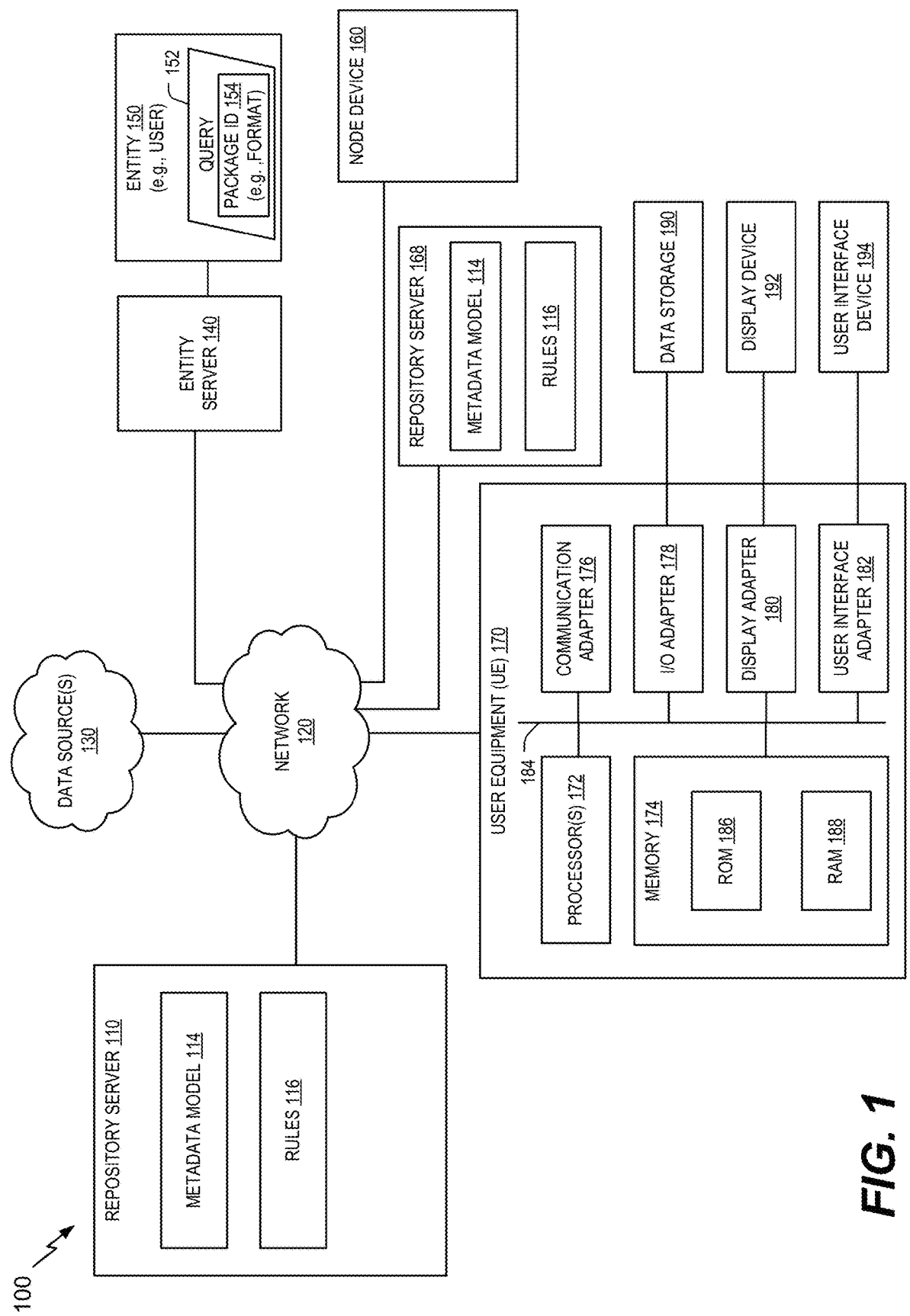
FIG. 1 is a block diagram of an example of a system that includes a server for package management.

Inventive concepts utilize a system to operate a metadata server including package management including development and/or deployment of software. To illustrate, a server may store a database model including a plurality of data structures each including one or more entries of multiple data objects, a set of mapping rules defining links between different data structures of the plurality of data structures, and a set of operation rules for executing operations on the data model. The database model (e.g., a metadata model) and one or more sets of rules may be used to enable efficient access to metadata in real time. The metadata may be utilized as part of package management including development and deployment of software. By maintaining the metadata according to the metadata model and the one or more sets of rules as described herein, the metadata may be stored without unnecessary duplication of data. Additionally, the metadata of multiple data structures may be obtained based on a single search or query and may be presented in a structured manner. Accordingly, the techniques described herein provide improved operation of the system by enabling non-duplicative storage of metadata, efficient access of the stored data, customization of access rights for different users/entities, and presentation of data aggregated from multiple data structures.

Certain units described in this specification have been labeled as modules in order to more particularly emphasize their implementation independence. A module is "[a] self-contained hardware or software component that interacts with a larger system." Alan Freedman, "The Computer Glossary" 268 (8th ed. 1998). A module may comprise a machine- or machines-executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, comprise one or more physical or logical blocks of computer instructions that may be organized as an object, procedure, or function. Nevertheless, the executables of an identified module need not be physically located together, but may comprise disparate instructions stored in different locations that, when joined logically together, comprise the module, and when executed by the processor, achieve the stated data transformation. A module of executable code may be a single instruction, or many instructions, and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the disclosure.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, or 5 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Similarly, the phrase "A, B, C, or a combination thereof" or "A, B, C, or any combination thereof" includes A alone, B alone, C alone, a combination of A and B, a combination of A and C, a combination of B and C, or a combination of A, B, and C.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any embodiment of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where."

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments.

Referring to FIG. 1, a block diagram of a system that includes a server for operating a metadata server including package management including development and deployment of software is shown and designated 100. For example, the server may track and securely update the software release across a network. System 100 includes a server 110 (e.g., a first repository server), a network 120, data sources 130, an entity server 140, an entity 150, a node device 160, a server 168 (e.g., a second repository server), and user equipment 170.

Server 110 may include one or more servers that, according to one implementation, are configured to perform several of the functions and/or operations described herein. One or more of the servers comprising server 110 may include memory, storage hardware, software residing thereon, and one or more processors configured to perform functions associated with system 100, as described further herein at least with reference to FIGS. 2 and 3. One of skill in the art will readily recognize that different server and computer architectures can be utilized to implement server 110, and that server 110 is not limited to a particular architecture so long as the hardware implementing server 110 supports the functions of the repository system disclosed herein. As shown in FIG. 1, user equipment can be used to enable an owner and/or administrator of repository server 110 to access and modify aspects (e.g., instructions, applications, data) of repository server 110. For example, components including user equipment 170, such as one or more processors 172, can be used to interface with and/or implement the server 110. Accordingly, user equipment 170 (e.g., a user station) may serve as a repository portal by which a user may access a repository system, such as a universal artifact repository, disclosed herein. For example, an artifact repository system may include server 110 (e.g., a first server) and server 168 (e.g., a second server). The portal can function to allow multiple users, inside and outside system 100 (e.g., at multiple instances of user equipment 170), to interface with one another. Additionally, it is noted that the one or more components described with reference to user equipment 170 may also be included in one or more of repository server 110, entity server 140, entity 150, node device 160, and/or server 168.

As shown, server 110 includes one or more a metadata model 114 and rules 116. Metadata model 114 include a plurality of data structures that are link according to rules 116. For example, various data structures, such as tables, of metadata may be linked such that an application programming interface (API) may search the various types of metadata using a single request. In some implementations, the metadata may correspond to one or more artifacts. The artifacts may include different package types. For example, a first artifact may correspond to a first package type, such as Maven, and a second artifact may correspond to a second package type, such as Bower. Rules 116 may include or correspond to rules for linking data structures (e.g., a set of mapping rules) in metadata model 114. Additionally, rules 116 may include operating rules (e.g., a set of operating rules) that enable performance of requests and enable access to the metadata associated with metadata model 114. For example, if a user has access to a particular path, the user may have access to search metadata corresponding to the path identifier (ID). If the user does not have access to the particular path, the user may be prohibited from searching metadata corresponding to the path ID.

Network 120, such as a communication network, may facilitate communication of data between server 110 and other components, servers/processors, and/or devices. For example, network 120 may also facilitate communication of data between server 110 and one or more data sources 130, entity server 140, a node device 160, server 168, or any combination therefore. Network 120 may include a wired network, a wireless network, or a combination thereof. For example, network 120 may include any type of communications network, such as a direct PC-to-PC connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate.

Data sources 130 include the sources from which server 110 collects information. For example, data sources may include one or more reciprocities of artifacts, such as open source artifacts, vulnerability data, and/or license data, as illustrative, non-limiting examples.

Entity server 140 may include one or more servers which entity 150 uses to support its operations. In some implementations, entity 150 includes or is configured to generate (or initiate generation of) a request 152. Request 152 may be a query for metadata corresponding to particular package or package type, a particular file, a particular build job, a particular version, or some other type of query. Alternatively, request 152 may be an add command or a delete command, as non-limiting examples. Request 152 may include a package ID 154 (e.g., a package ID format). Package ID 154 may identify what metadata is to be accessed by repository server 110 in response to request 152.

Entity 150 may include any individual, organization, company, corporation, department (e.g., government), or group of individuals. For example, one entity may be a corporation with retail locations spread across multiple geographic regions (e.g., counties, states, or countries). As another example, another entity may be a corporation with cruise ships. As another example, another entity may be a group of one or more individuals. In a particular implementation, entity 150 includes a business and at least one user who can access server 110. For example, the user may access server 110 via an application, such as an application hosted by server 110. To illustrate, the user may have an account (e.g., on behalf of entity 150) and may log in to server 110 via the application. Although system 100 shows one entity 150, in other implementations, system 100 includes multiple entities. In a particular implementation, the multiple entities may include a first entity and a second entity, as described further herein at least with reference to FIG. 2. In such implementations, the first entity and the second entity may be the same entity (e.g., part of the same company) or may be different entities.

Node device 160 includes one or more release files 162. To illustrate, software (e.g., packages), such as the one or more release files, hosted at node device 160 may be part of a software release which is a secure and immutable collection of one or more artifacts that make up a software release. In some implementations, the release files include or correspond to a release list. The release files stored at and/or executed by node device 160 may be tracked by repository server 110 using a transaction log.

In some implementations, node device 160 may include or correspond to entity 150. Although system 100 is shown as having one node device 160, in other implementations, the system 100 may include multiple node devices (e.g., 160). Node device 160 may include a data center, a point-of-sale, a mobile device, or an Internet of things (IoT) device. In some implementations, node device 160 includes a communications device, a fixed location data unit, a mobile location data unit, a mobile phone, a cellular phone, a satellite phone, a computer, a tablet, a portable computer, a display device, a media player, or a desktop computer. Alternatively, or additionally, node device 160 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle or a device integrated within a vehicle, any other device that includes a processor or that stores or retrieves data or computer instructions, or a combination thereof. In other illustrative, non-limiting examples, the system, the device, or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Server 168 may be a repository server and may include or correspond to server 110. In some implementations, server 110 and server 168 may be included in a universal artifact management system. Server 110 and server 168 may execute different environments while sharing artifacts. In some implementations, server 168 includes metadata model 114 and rules 116.

With respect to user equipment 170, user equipment may include one or more processors 172, memory 174, a communication adapter 176, an input/output adapter 178, a display adapter 180, a user interface adapter 182, and a bus 184. As shown, each of one or more processors 172, such as a central processing unit (CPU), memory 174, communication adapter 176, input/output adapter 178, display adapter 180, and user interface adapter 182 are coupled to/via bus 184. As noted above, one or more components of user equipment 170 may also be included in one or more other devices, such as server 110, to enable and/or support operations and functionality at the other device.

One or more processors 172 may include a CPU or microprocessor, a graphics processing unit ("GPU"), and/or microcontroller that has been programmed to perform the functions of user equipment 170. Implementations described herein are not restricted by the architecture of the one or more processors 172 so long as the one or more processors 172, whether directly or indirectly, support the operations described herein. The one or more processors 172 may be one component or multiple components that may execute the various described logical instructions.

Memory 174 includes read only memory (ROM) 186 and random access memory (RAM) 188. ROM 186 may store configuration information for booting user equipment 170. ROM 186 can include programmable read-only memory (PROM), erasable programmable read-only memory (EPROM), electrically erasable programmable read-only memory (EEPROM), optical storage, or the like. User equipment 170 may utilize RAM 188 to store the various data structures used by a software application. RAM 188 can include synchronous RAM (SRAM), dynamic RAM (DRAM), synchronous dynamic RAM (SDRAM), or the like. ROM 186 and RAM 188 hold user and system data, and both ROM 186 and RAM 188 may be randomly accessed. In some implementations, memory 174 may store the instructions that, when executed by one or more processor 172, cause the one or more processors 172 to perform operations according to aspects of the present disclosure, as described herein.

Communications adapter 176 can be adapted to couple user equipment 170 to a network, which can be one or more of a LAN, WAN, and/or the Internet. Therefore, in some embodiments, server 110 may be accessed via an online portal. The I/O adapter 178 may couple user equipment 170 to one or more storage devices 190, such as one or more of a hard drive, a solid state storage device, a flash drive, a compact disc (CD) drive, a floppy disk drive, a tape drive, and/or the like. Also, data storage devices 190 can be a separate server coupled to user equipment 170 through a network connection to I/O adapter 178. Display adapter 180 can be driven by one or more processors 172 to control presentation via display device 192. In some implementations, display adapter 180 may display a graphical user interface (GUI) associated with a software or web-based application on display device 192, such as a monitor or touch screen. User interface adapter 182 couples user interface device 194, such as a keyboard, a pointing device, and/or a touch screen to the user equipment 170. The I/O adapter 178 and/or the user interface adapter 182 may, in certain embodiments, enable a user to interact with user equipment 170. Any of devices 172-184 may be physical and/or logical.

The concepts described herein are not limited to the architecture of user equipment 170. Rather, user equipment 170 is provided as an example of one type of computing device that can be adapted to perform the functions of server 110 and/or a user interface device. For example, any suitable processor-based device can be utilized including, without limitation, personal data assistants (PDAs), tablet computers, smartphones, computer game consoles, multi-processor servers, and the like. Moreover, the systems and methods of the present disclosure can be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. Additionally, it should be appreciated that user equipment 170, or certain components thereof, may reside at, or be installed in, different locations within system 100.

In some implementations, server 110 (and/or server 168) can comprise a server and/or cloud-based computing platform configured to perform operations and/or execute the steps described herein. Accordingly, server 110 (and/or server 168) may include a particular purpose computing system designed, configured, or adapted to perform and/or initiate operations, functions, processes, and/or methods described herein and can be communicatively coupled with a number of end user devices (e.g., user equipment 170), which can be, e.g., a computer, tablet, smartphone, or other similar end user computing device. Users can interact with server 110 (and/or server 168) using a device via one or more networks, such as network 120, which itself can comprise one or more of a local intranet, a LAN (Local Area Network), a WAN (Wide Area Network), a virtual private network (VPN), and the like. As will be apparent to those of skill in the art, communicative coupling between different devices of system 100 can be provided by, e.g., one or more of wireless connections, a synchronous optical network (SONET) connection, a digital T1, TN, E1 or E3 line, Digital Data Service (DDS) connection, DSL (Digital Subscriber Line) connection, an Ethernet connection, and the like.

Figure 2:
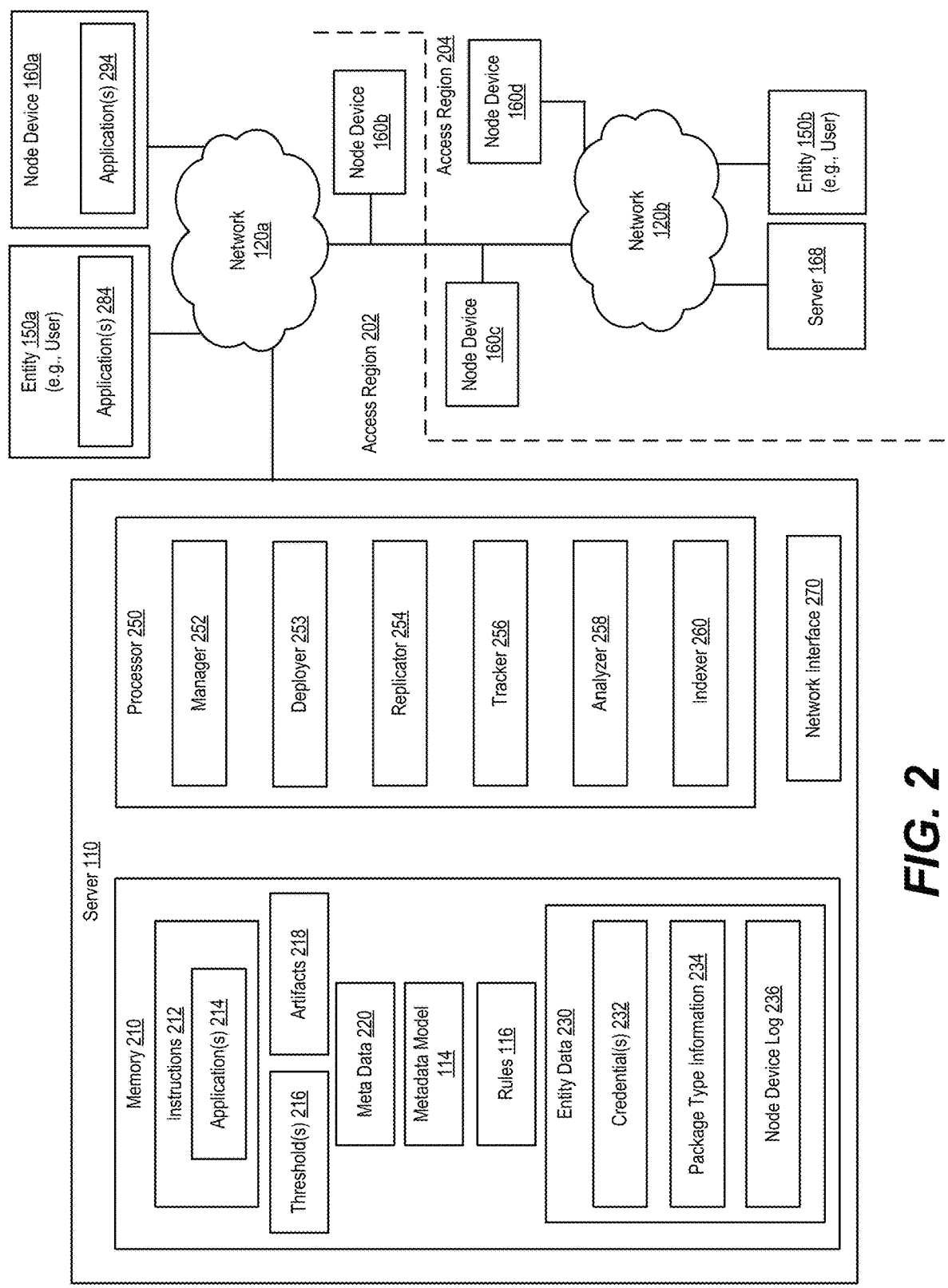
FIG. 2 is a block diagram of another example of a system for package management.

Referring to FIG. 2, a block diagram of a system for operating a metadata server for package management including development and deployment of software according to an embodiment is shown as a system 200. For example, system 200 may store and link metadata. System 200 may include or correspond to at least a portion of system 100. System 200 includes server 110, networks 120*a*, 120*b*, entities 150*a*, 150*b*, node devices 160*a*, 160*b*, 160*c*, 160*d*, and server 168. As shown in FIG. 2, system 200 is spread across multiple regions, such as a first region 202 and a second region 204. For example, each region may correspond to a different city, county, state, country, continent, or other physical or logical distinction. To illustrate, first region 202 may include or correspond to North America (e.g., the United States) and second region 204 may include or correspond to Asia (e.g., Japan).

As shown, server 110 is included in first region 202 and server 168 is included in second region 204. Server 168 may be a repository server and may include or correspond to server 110. In some implementations, server 110 and server 168 may be included in a universal artifact management system. Networks 120*a*, 120*b* may include or correspond to network 120. Each of the entities 150*a*, 150*b* may include or correspond to entity 150. In some implementations, a first entity 150*a* and a second entity 150*b* may be part of the same group, company, etc., or may be part of different groups, companies, etc. Each of node devices 160*a*, 160*b*, 160*c*, 160*d* may include or correspond to node device 160. In some implementations, each of node devices 160*a*, 160*b*, 160*c*, 160*d* corresponds to the same entity. In other implementations, at least one node device of node devices 160*a*, 160*b*, 160*c*, 160*d* corresponds to another entity.

Server 110 may include a memory 210 (e.g., one or more memory devices), one or more processors 250, and a network interface 270. Network interface 270 may be configured to be communicatively coupled, via one or more networks (e.g., 120*a*, 120*b*) to one or more external devices, such as one or more of entities (e.g., 150*a*, 150*b*), one or more node devices (e.g., 160*a*, 160*b*, 160*c*, 160*d*), one or more servers (e.g., 168), one or more data sources (e.g., 130), or any combination thereof. For example, network interface 270 may include a transmitter, a receiver, or a combination thereof (e.g., a transceiver).

Memory 210 may include ROM devices, RAM devices, one or more HDDs, flash memory devices, SSDs, other devices configured to store data in a persistent or non-persistent state, or a combination of different memory devices. Memory 210 includes (e.g., is configured to store) instructions 212, thresholds 216, artifacts 218 (e.g., binaries), metadata 220, a metadata model 114, rules 116 (e.g., a set of mapping rules, a set of operation rules, or both), and entity data 230. For example, memory 210 may store instructions 212, that when executed by the one or more processors 250, cause the processor(s) 250 to perform functions, methods, processes, operations as described further herein. In some implementations, instructions 212 may include or be arranged as an application 214 (e.g., a software program) associated with a universal artifact repository. For example, application 214 may provide a portal via which one or more entities and/or users interact with and access server 110. To illustrate, application 214 may provide a portal that enables an entity or user to search metadata 220, the metadata model, one or more files 114, or a combination thereof. In some implementations, the application 214 is configured to present one or more search options via the portal and to receive a request from the user or the entity. The request may include a selection of one or more search options, data or criteria to be searched, or a combination thereof, as illustrative, non-limiting examples. Additionally, or alternatively, application 214 may provide a portal via which an output is provided to the user or the entity. For example, the output may include or correspond to a result of the request and/or a search portion. To illustrate, application 214 may perform a search operation to identify metadata from one or more data structures and may output at least a portion of the identified metadata via the portal. In some implementations, application 214 may execute an API to perform the search operation. The metadata may be presented or arranged according to an output format. In some implementations, application 214 may enable additional searching and/or filtering of the identified metadata (e.g., the presented metadata).

Application 284 at entity 150a and application 294 at node device 160a are configured to enable entity 150a and node device 160a to communicate with and/or access server 110. In some implementations, each of application 284 and application 294 enable functionality as described with respect to server 110. In other implementations, application 284 and application 294 may enable and/or support less than all of the functionality as described with reference to server 110. To illustrate, application 294 may not provide functionality as described with reference to replicator 254.

In some implementations, memory 210 includes multiple memories accessible by processor 250. In some such implementations, one or more of the memories may be external to server 110. To illustrate, at least one memory may include or correspond to a database accessible to server 110, such as a database that stores one or more thresholds 216, artifacts 218, metadata 220, metadata model 114, rules 116, entity data 230, or any combination thereof. In some implementations, memory 210 may include or be coupled to cloud storage such that one or more thresholds 216, one or more of artifacts 218, metadata 220, metadata model 114, rules 116, and/or entity data 230 is stored at a cloud storage location and accessible by server 110.

Threshold(s) 216 may include or correspond to one or more thresholds, such as a time period threshold, a size threshold, a link threshold, etc. Artifacts 218 may include or correspond to one or more artifacts (e.g., files). Metadata 220 may include metadata for artifacts 218, metadata for application 214, metadata for one or more files, or any combination thereof. Metadata for an artifact may include a file name, a file size, a checksum of the file, and/or one or more properties that annotate the artifact, such as when the artifact was created by a build, a build job name, an identifier of who initiated the build, a time the build was initiated, a build agent, a CI server, a build job number, and/or a quality assurance test passed indicator, as illustrative, non-limiting examples. Memory 210 may also include software release information, which may include one or more checksums and metadata, such as metadata 220.

Metadata model 114 includes one or more data structures including metadata generated by server 110. The one or more data structures may be linked in accordance with rules 116. Illustrative, non-limiting examples of metadata models are further described herein with reference to FIGS. 4 and 5A-5B. Rules 116 indicate mapping (e.g., linking) of one or more data structures of metadata model 114. Additionally, rules 116 may include one or more operational rules for performing one or more operations with respect to the metadata and/or for accessing the metadata (e.g., metadata 220). For example, rules 116 may indicate whether a particular user ID has access to a particular path ID, and if so, access to search metadata corresponding to the particular path ID.

Entity data 230 may include data associated with one or more entities. For example, entity data 230 may include or correspond to one or more of entity 150a, 150b. Entity data 230 may include one or more credentials 232, package type information 234, and a node device log 236. Credential 232 include login information to enable one or more users and/or one or more entities to access server 110. Additionally, or alternatively, credential 232 may include security or authentication information, such as a private key, a public key, and/or a token of a user and/or entity. In some implementations, credentials 232 may include or indicate access, such as access permissions, for a user or entity. To illustrate, the access permissions may correspond to authorization to access a set of the plurality of data structures. In some implementations, application 214 may identify the access permissions from the credentials 232 based on an identifier, such as a user identifier or an entity identifier. The application 214 may also identify one or more rules 116, such as one or more mapping rules, for execution based on the access permissions and execute the one or more mapping rules to authorize active links between multiple data structure of the plurality of data structures. The active links may correspond to or enable data structures and/or metadata that the user or entity is authorized to access, or that may be searched, modified, updated, created, replaced, deleted, or viewed by the user or entity.

Package type information 234 may identify one or more package types used by the corresponding entity. As illustrative, non-limiting examples, the one or more package types may include Bower, Chef, CocoaPods, Conan, Conda, CRAN, Debian, Docker, Git LFS, Go, Helm, Maven, npm, NuGet, Opkg, P2, PHP Composer, Puppet, PyPI, RPM, RubyGems, SBT, Vagrant, and VCS. Node device log 236 includes node device information of one or more node devices corresponding to an entity of entity data 230. To illustrate, node device log 236 may include topology information (e.g., location information) of one or more node devices, one or more node device identifiers, owner/manager information, file and/or software information (e.g., name, version number, size, etc.) installed at one or more node devices, or any combination thereof, as illustrative, non-limiting examples. In some implementations, node device log 236 may indicate a set of target nodes at which one or more security objects are to be synchronized.

Processor 250 may include may be a CPU (e.g., processor 172) or microprocessor, a graphics processing unit ("GPU"), a field-programmable gate array (FPGA) device, an application-specific integrated circuits (ASIC), another hardware device, a firmware device, a microcontroller, or any combination thereof that has been programmed to perform the functions. As shown in FIG. 2, in an implementation, server 110 (e.g., processor 250) may include a manager 252, a deployer 253, a replicator 254, a tracker 256, an analyzer 258, and an indexer 260. In some implementations, processor 250 may include one or more modules. For example, each of manager 252, deployer 253, replicator 254, tracker 256, analyzer 258, and indexer 260 may include or correspond to one or more modules. In an implementation, server 110 (e.g., processor 250 or modules 252, 253, 254, 256, 258, 260) may be configured to execute one or more routines that perform various operations as described further herein. A module is "[a] self-contained hardware or software component that interacts with a larger system." Alan Freedman, "The Computer Glossary" 268 (8th ed. 1998). A module may comprise a machine- or machines-executable instructions. A module may also be implemented in programmable hardware devices such as field programmable gate arrays, programmable array logic, programmable logic devices or the like. Modules may also include software-defined units or instructions, that when executed by a processing machine or device, transform data stored on a data storage device from a first state to a second state. Modules may be separate or two or more may be combined.

In some implementations, one or more of modules (e.g., 252, 253, 254, 256, 258, 260) may locally reside in memory 210 or in a separate location. Further, as will be understood by those of skill in the art, a "module" can include an application-specific integrated circuit ("ASIC"), an electronic circuit, a processor (shared, dedicated, or group) that executes one or more of software or firmware, a combinational logic circuit, and/or other suitable components that provide the described functionality. Operations of one or more of modules, such as manager 252, deployer 253, replicator 254, tracker 256, analyzer 258, or indexer 260, may generate or update metadata (e.g., 220) included in one or more data structures of metadata model 114.

Referring to processor 250, manager 252 may be configured to enable a user (e.g., 150a) to manage one or more other components/modules (e.g., 253, 254, 256, 258, 260) of processor 250. Additionally, or alternatively, manager 252 may enable storage of and/or access to one or artifacts 218. In some implementations, manager 252 may enable administration of multiple instances of a user account, such as a first instance at server 110 and a second instance at server 168. Accordingly, manager 252 may be configured to operate as an administrative tool that enables an entity (e.g., 150a) to monitor and control a first instance of a user account (corresponding to first region 202) and a second instance of the user account (corresponding to second region 204). For example, the entity (e.g., 150a) may be able to see which services (e.g., 253, 254, 256, 258, 260) are operating in different regions, add/modify/remove individual users in different regions, set different permissions for individual users in different regions, provide and store one or more public keys, etc. Additionally, or alternatively, manager 252 may be configured to manage and/or maintain metadata model 114. For example, to manage or maintain metadata model 114, manager 252 may access and execute one or more rules 116. Additionally, or alternatively, manager 252 may be configured to execute application 214. To illustrate, manager 252 may identify access permissions from credentials 232 based on an identifier, such as a user identifier or an entity identifier. Additionally, or alternatively, manager 252 may identify one or more rules 116, such as one or more mapping rules, for execution based on the access permissions and execute the one or more mapping rules to authorize active links between multiple data structures of the plurality of data structures. In some implementations, manager 252 includes a manager module that includes one or more routines, executable by one or more processors (e.g., the processor 172 of FIG. 1) or processor 250 to enable a user (e.g., 150a) to manage one or more other components/modules (e.g., 253, 254, 256, 258, 260) of processor 250, as described herein.

Deployer 253 may be configured to perform a software release distribution. For example, deployer 253 provides a secure and structured platform to distribute release binaries as a single coherent release bundle to multiple remote locations and update them as new release versions are produced. A release bundle may include one or more files and/or release information which includes or indicates a list of the one or more files (e.g., artifacts) to be included in the release bundle and metadata (e.g., properties) associated with the release bundle. The release information may include, for each file of the bundle release, a checksum (of the file), metadata (corresponding to the file), or both. In some implementations, the release bundle also includes additional metadata (e.g., file name, file size, path to the file, etc.) corresponding to the release bundle, such as a release bundle name, a version number, a source identifier, description information, release data, and/or a size. Additionally, or alternatively, the release information may include a signature (or other cryptography technique) to render the release information immutable.

Deployer 253 may enable generation of a release bundle, auditing and traceability by tracking all changes associated with a release bundle distribution of the release bundle including permission levels release content, scheduling of a release bundle for distribution, tracking of a release bundle, stopping distribution of a release bundle, and/or selection of target destinations. Compiling and maintaining the information by deployer 253 enables tracker 256 to perform tracking of software releases to various node devices. Additionally, or alternatively, a software release may be provisioned amongst one or more nodes devices (e.g., 160a, 160b, 160c, 160d). In some implementations, as part of the release flow, release bundles are verified by the source and/or destination to ensure that they are signed correctly and safe to use. In some implementations, deployer 253 includes a deployer module that includes one or more routines, executable by one or more processors (e.g., the processor 172 of FIG. 1) or processor 250 to perform a software release distribution.

Replicator 254 may be configured to coordinate and provide one or more artifacts (e.g., one or more files) and/or metadata between two or more devices. For example, replicator 254 may coordinate transfer of one or more artifacts (e.g., one or more files) and/or metadata between server 110 and server 168, between server 110 and one or more of node devices 160a, 160b, 160c, 160d, or both. Replicator 245 may be configured to determine a difference between files in a software release and files stored at a node device and to replicate the files that are not stored at the node device. In some implementations, replicator 254 is configured to be used in conjunction with deployer 253 to distribute a software release, provide efficient network utilization by optimizing replication, and reduce network load and/or release bundle synchronization time from source device (e.g., server 110) to target instance (e.g., server 168) or node device (e.g., 160a, 160b, 160c, 160d). Additionally, or alternatively, replicator 254 may be configured to identify a difference between at least one file stored at a first device (e.g., server 110) and one or more files stored at a second device (e.g., server 168 or a node device), and initiate transfer of at least one or more portions of a file to the second device. In some implementations, replicator 254 includes a replicator module that includes one or more routines, executable by one or more processors (e.g., the processor 172 of FIG. 1) or processor 250 to coordinate and provide one or more artifacts (e.g., one or more files) and/or metadata between two or more devices.

Tracker 256 may be configured to track one or more artifacts, metadata, one or more release bundles, or any combination thereof deployed or attempted to be deployed to a node device, such as one or more of node devices 160a, 160b, 160c, 160d, a server (e.g., server 110, 168), or both. In some implementations, tracker 256 includes a tracker module that includes one or more routines, executable by one or more processors (e.g., the processor 172 of FIG. 1) or processor 250 to track one or more artifacts, metadata, one or more release bundles, or any combination thereof deployed or attempted to be deployed to a node device, such as one or more of node devices 160a, 160b, 160c, 160d, and/or one or more servers.

Analyzer 258 may be configured to analyze one or more artifacts (e.g., 218) and/or metadata (e.g., 222) to identify a vulnerability corresponding to the one or more artifacts, determine license compliance of the one or more artifacts, and/or determine an impact of an issue with a deployed file (e.g., artifact). In some implementations, analyzer 258 is configured to analyze data stored at memory 210, identify issues related to deployed software, perform recursive scanning, and perform an impact analysis. In some implementations, analyzer 258 includes an analyzer module that includes one or more routines, executable by one or more processors (e.g., the processor 172 of FIG. 1) or processor 250 to analyze one or more artifacts (e.g., 218) and/or metadata (e.g., 222) to identify a vulnerability corresponding to the one or more artifacts, determine license compliance of the one or more artifacts, and/or determine an impact of an issue with a deployed file (e.g., artifact).

Indexer 260 may be configured to provide an indexing capability, including maintaining interdependencies and information, for one or more package types. Additionally, or alternatively, indexer 260 is configured to generate metadata (e.g., 220), such as metadata defined by a universal artifact repository manager and utilized by one or more of manager 252, deployer 253, replicator 254, tracker 256, and analyzer 258. In some implementations, indexer 260 includes an indexer module that includes one or more routines, executable by one or more processors (e.g., the processor 172 of FIG. 1) or processor 250 to provide an indexing capability, including maintaining interdependencies and information, for one or more package types.

Figure 3:
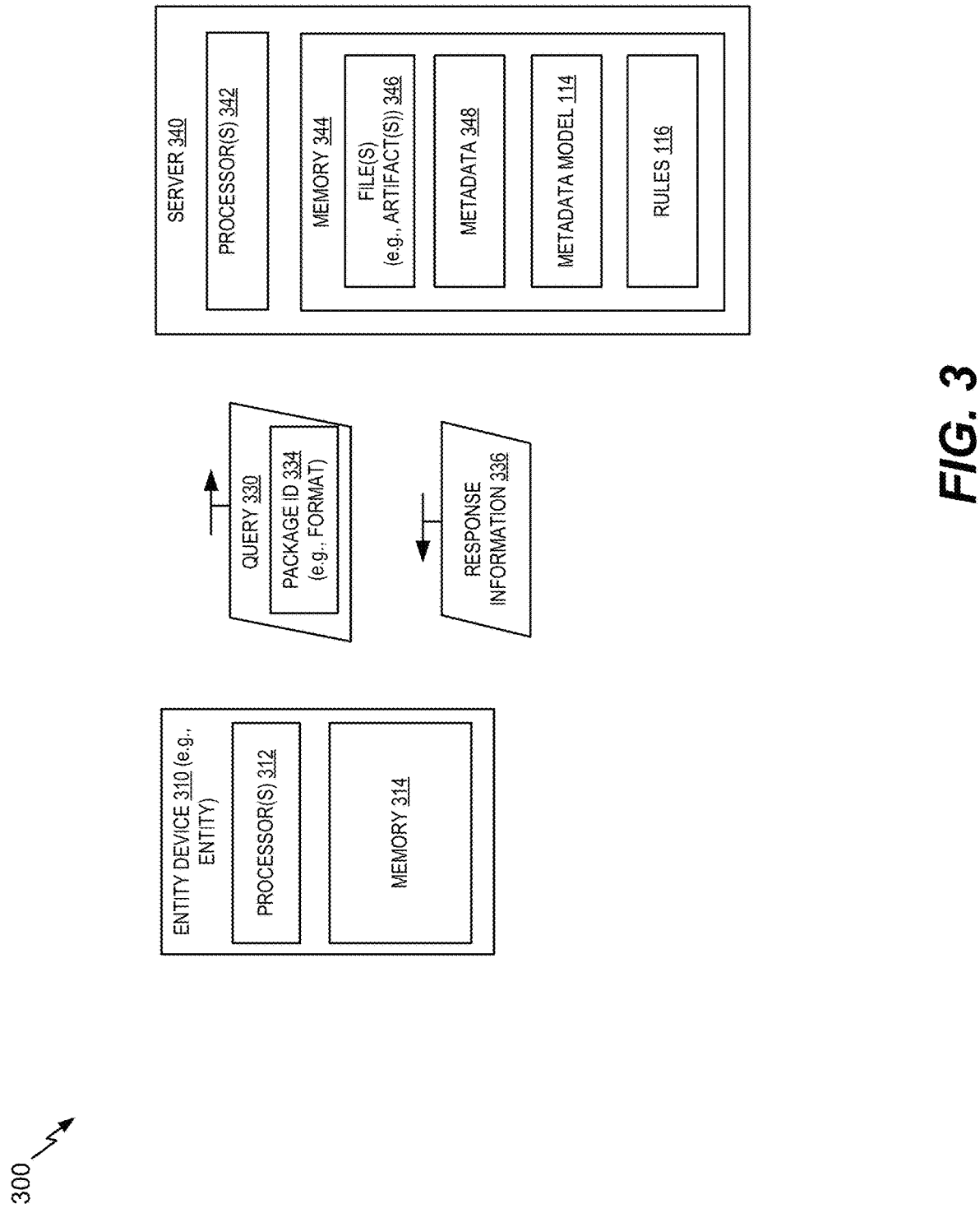
FIG. 3 is a block diagram of another example of a system for package management.

Referring to FIG. 3, a block diagram of a system for operating a metadata server for package management including development and/or deployment of software is shown and designated 300. System 300 may include or correspond to at least a portion of system 100 and/or system 200. System 300 includes an entity device 310 (also referred to herein as an entity or a user) and a server 340. Entity device 310 and server 340 may be coupled via one or more networks, such as network 120. Entity device 310 may include or correspond to entity server 140, entity 150, 150*a*, 150*b*, or any combination thereof. Server 340 may include or correspond to server 110, server 168, or a combination thereof.

Entity device 310 includes one or more processors 312 and a memory 314. Memory 314 may include instructions (not shown) that are executable by processor 312 to cause processor 312 to perform one or more operations. In some implementations, the instructions may include or be arranged as an application, such as application 284 (e.g., a software program), associated with server 340. The operations may include sending software information, receiving notifications, and/or sending instructions, as further described herein.

Server 340 includes one or more processors 342 and a memory 344. Processor 342 may include or correspond to processor 250. Memory 344 may include or correspond to memory 210. Memory 344 includes a one or more files 346 (e.g., artifacts), metadata 348, metadata model 114, and rules 116, as further described herein. In some implementations, metadata model 114 (e.g., a database model) includes comprises a strong type model. Metadata model 114 may include a plurality of data structures, such as a package data structure, a version data structure, a file data structure, a vulnerability data structure, a package information source data structure, a package type data structure, a read me data structure, a version release notes data structure, or a combination thereof, as illustrative, non-limiting examples. For example, the package date structure including multiple data objects comprising a package identifier, a type, a name, a qualifier, a description, website universal resource locator, created information, license information, modified information, latest version information, version information, a download count, a follower count, a rating, tags, user properties, package information sources, or a combination thereof. As another example, the version data structure may include package specific immutable information, such as a name, a package identifier, licenses, release information, and repository location.

The one more files 346 may include or correspond to artifacts 218. In some implementations, files 346 may include or be a part of one or more software releases. Additionally, memory 344 may include instructions (not shown) that are executable by processor 342 to cause processor 342 to perform one or more operations. In some implementations, the instructions may include or be arranged as an application, such as application 214 (e.g., a software program).

Although system 300 is described as including one server 340, in other implementations, system 300 may include multiple servers (e.g., 340) coupled to entity device 310 and/or node device 360. Additionally, or alternatively, it is noted that server 340 (e.g., processor 342) may include one or more additional components or modules, such as manager 252, deployer 253, replicator 254, tracker 256, analyzer 258, and/or indexer 260, as illustrative, non-limiting examples.

During operation of system 300, entity device 310 may send a request 330 (or query) to server 340. In a particular implementation, request 330 may be a query, an add command, or a delete command, as non-limiting examples. In some implementations, request 330 may include or correspond to one or more operations including search, download, upload, create, build, delete, replace, update, query, list, filter, deploy, or a combination thereof. Request 330 may correspond to metadata 348 stored at server 340 (e.g., at memory 344). To identify which metadata request 330 corresponds to, request 330 includes a package ID 332 (e.g., a package ID format). The package ID may correspond to a path. In some implementations, request 330 may also include identifying information, such as a user identifier associated with request 330. Although described as receiving request 330 from entity device 310, in other implementations, a request may be generated internally by server 340. For example, analyzer 258 or another component of processor 342 may generate a request with reference to metadata 348.

In some implementations, prior to receiving query 330, server 340 may receive a user identifier for entity device 310. For example, the user identifier may include or correspond to login credentials (e.g., credentials 232). Server 340 may determine, based on the user identifier, access permissions for the entity. Server 340 may determine the access permission and/or identify one or more mapping rules based on executing set of operation rules (of rules 116). The access permissions may correspond to authorization to permission to access a set of the plurality of data structures of metadata model 114. In some implementations, to determine the access permissions for the entity, server 340 may identify one or more active licenses corresponding to the entity, identify one or more permissions corresponding to the user identifier, determine user access permissions for a user corresponding to the user identifier (e.g., the user access permission for the user being different from the access permissions for the entity), or a combination thereof. The one or more active license may include a first license for a service entity configured to access the database model to perform vulnerability analysis queries on packages based one or data structures, a second license for universal artifact repository, or both.

In some implementations, server 340 may identify one or more mapping rules (of rules 116) for execution based on the access permissions. Server 340 may execute the one or more mapping rules to authorize active links between multiple data structure of the plurality of data structures (of metadata model 114). In some implementations, prior to receiving query 330 (e.g., request), server 340 may send to entity device 310 one or more search options corresponding to a package search, the one or more search options include a package name, a package type, a version, a repository name, a checksum, a keyword tag, a description, or a combination thereof. In other implementations, prior to receiving query 330 (e.g., request), server 340 may send to entity device 310 one or more search options corresponding to a version search, the one or more search options include a package name, a package type, a version name, a repository name, a checksum (e.g., a unique identifier of a package, version, artifact, etc.), a keyword tag, a description, or a combination thereof, as illustrative, non-limiting examples. Examples of user interfaces associated with one or more search operations and/or search result output(s) are described further herein at least with reference to FIGS. 7-9. In some such implementation, query 330 may correspond to a selection of at least one of the one or more search options.

After receiving query 330 (e.g., a request) from entity device 310, server 340 may access at least a portion of the requested metadata from the multiple data structures that have authorized active links. For example, server 340 may generate based on the set of operation rules, a search query operation corresponding to a package identifier format that includes a package type field.

Server 340 may provide response information (e.g., an output) of the accessed at least a portion of the requested metadata to entity device 310. Response information 336 of the accessed at least a portion of the requested metadata may be arranged according to an output format, such as an ordered arrangement of the metadata. Examples of an output, such as a graphical user interface, that include response information are described further herein at least with reference to FIGS. 7-9. In some implementations, response information 336 includes the package name, a number of repositories, a name of one or more repositories, a number of downloads, a number of versions, a last modified indicator, one or more keyword tags, a description, license information, a checksum, release notes information, a rating indicator, review information, an owner, or a combination thereof. In other implementations, response information 336 may include a version name, a repository name, a last modified indicator, download information, a manifest, one or more keywords, one or more properties, one or more dependencies, license information, a description, a size, one or more security vulnerabilities, one or more licenses vulnerabilities, a component identifier, a release date, release notes, a publish date, a nearest upstream version, a closest upstream version with no vulnerabilities, or a combination thereof.

In some implementations, for each package having multiple versions, a single package is designated as a primary package and each other package is designated as a secondary package. For example, the primary package may correspond to a package data structure and each secondary package may correspond to a version data structure which is linked to the package data structure. It is noted that in such implementations, vulnerability information for each secondary package corresponds to a vulnerability data structure which is linked to the version data structure. The vulnerability data structure may include metadata associated with vulnerability information that may indicate vulnerabilities with one or more artifacts or versions of artifacts. For example, the metadata included in the vulnerability data structure may include or indicate one or more checksums (indicating artifacts for which a risk is detected), license information associated with one or more artifacts, public keys that correspond to private keys used to affirm that a software release has successfully completed one or more stages of a development process, or a combination thereof, as illustrative, non-limiting examples. In some such implementations, the one or more mapping rules, when executed by server 340, are applied to the primary package based on the access permissions. If the primary package is determined to be accessible based on the access permissions, the one or more mapping rules are applied to each secondary package. Alternatively, if the primary package is determined to be inaccessible based on the access permissions, the one or more mapping rules are not applied to each secondary package.

In a particular implementation of system 300, the plurality of data structures (of metadata model 114) at least include a package data structure, a version data structure, a vulnerability data structure, a licensing information data structure, a build information data structure, and a file-level information data structure. In some such implementations, the package data structure is directly linked to the version data structure, the vulnerability data structure, the licensing information data structure, the build information data structure, the file-level information data structure, or a combination thereof. The package data structure may be accessible to entity device 310 independent of the access permissions—e.g., access of package data structure does not require access permissions.

In some implementations, for each request (e.g., 330) received by server 340, server 340 may execute the set of operation rules (e.g., 116) to generate event data and initiate storage of one or more portions of the event data at one or more data structures of the plurality of data structures. Each request and each corresponding output (E.g., 336) may be provided in real-time. The output may include information from multiple data structures of the plurality of data structures. For example, the output may include, for each version of the package, build information, vulnerability information, or both.

Thus, FIG. 3 describes a system (e.g., 300) that manages and maintains metadata. For example, metadata model 114 and one or more sets of rules (e.g., 116) may be used to enable efficient access to metadata in real time. The metadata may be utilized as part of package management including development and deployment of software. By maintaining the metadata according to the metadata model 114 and the one or more sets of rules as described herein, the metadata may be stored without unnecessary duplication of data. Additionally, the metadata of multiple data structures may be obtained based on a single search or query and may be presented in a structured manner. Accordingly, the techniques described herein provide improved operation of the system by enabling non-duplicative storage of metadata, efficient access of the stored data, customization of access rights for different users/entities, and presentation of data aggregated from multiple data structures.

Figure 4:
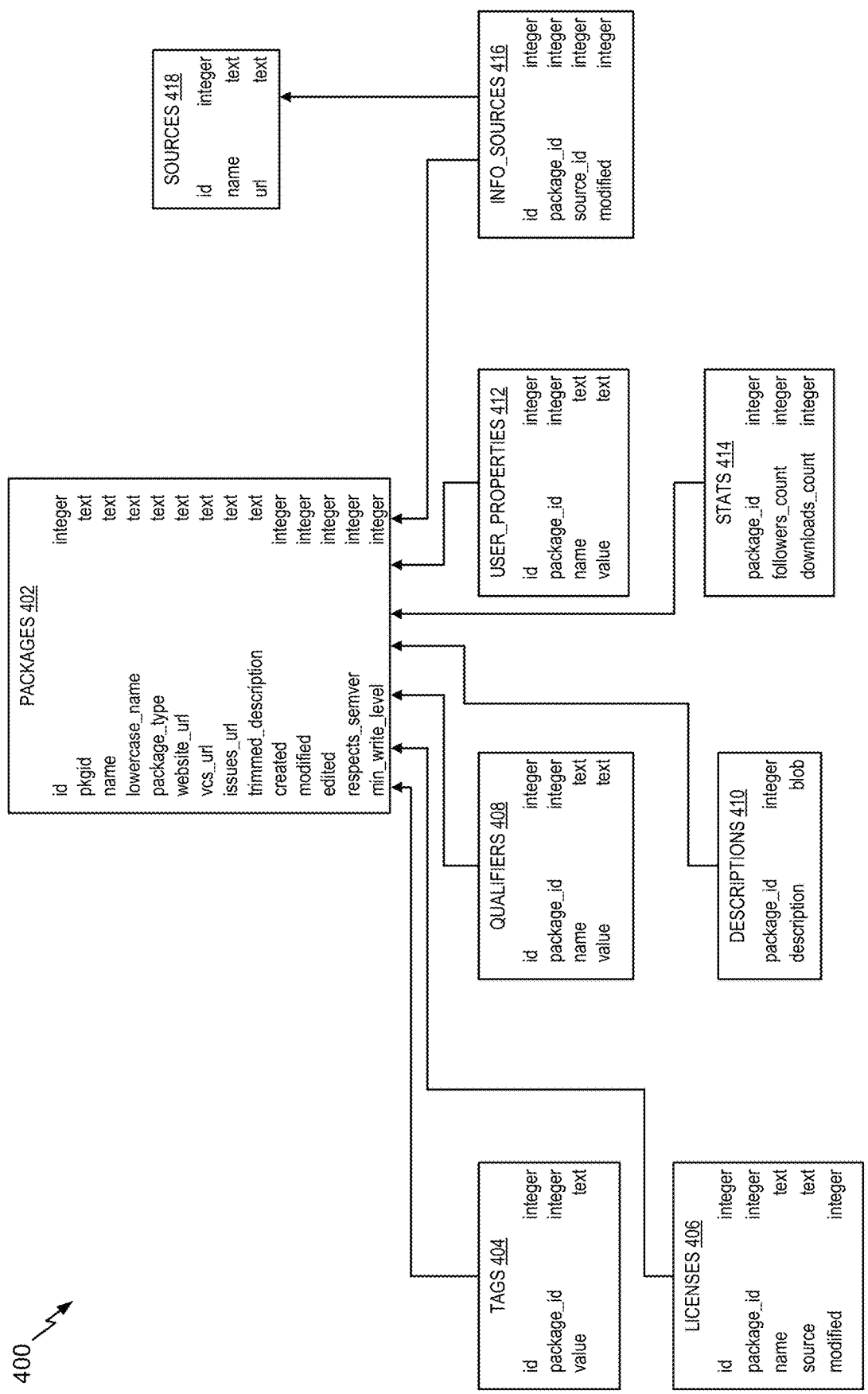
FIG. 4 illustrates a first example of a metadata model.

Referring to FIG. 4, a first example of a metadata model 400 is shown. Metadata model 400 includes a plurality of data structures. In a particular implementation, metadata model 400 includes a packages data structure 402, a tags data structure 404, a licenses data structure 406, a qualifiers data structure 408, a descriptions data structure 410, a user properties data structure 412, a stats data structure 414, an info sources data structure 416, and a sources data structure 418. In other implementations, metadata model 400 may include fewer than nine or more than nine data structures.

Each of the data structures 402-418 include one or more fields and contain information. For example, packages data structure 402 may include an ID field ("id"), a package ID field ("pkgid"), a name field ("name"), a lowercase name field ("lowercase_name"), a package type field ("package_type"), a website uniform resource locator (URL) field ("website_url"), a vcs URL field ("vcs_url"), an issues URL field ("issues_url"), a trimmed description field ("trimmed description"), a created time field ("created"), a modified time field ("modified"), an edited time field ("edited"), a respects semvar field ("respects_semvar"), and a minimum write level field ("min_write_level"). Tags data structure 404 may include an ID field ("id"), a package ID field ("package_id"), and a value field ("value"). Licenses data structure 406 may include an ID field ("id"), a package ID field ("package_id"), a name field ("name"), a source field ("source"), and a modified time field ("modified"). Qualifiers data structure 408 may include an ID field ("id"), a package ID field ("package_id"), a name field ("name"), and a value field ("value"). Descriptions data structure 410 may include a package ID field ("package_id") and a description field ("description"). User properties data structure 412 may include an ID field ("id"), a package ID field ("package_id"), a name field ("name"), and a value field ("value"). Stats data structure 414 may include a package ID field ("package_id"), a followers count field ("followers_count"), and a downloads count field ("downloads_count"). Info sources data structure 416 may include an ID field ("id"), a package ID field ("package_id"), a source ID field ("source id"), and a modified time field ("modified"). Sources data structure 418 may include an ID field ("id"), a name field ("name"), and a URL field ("url"). In other implementations, data structures 402-418 may include fewer than or more than (or different) fields than those illustrated in FIG. 4. Additionally, as shown in FIG. 4, each field is associated with a corresponding data type, such as an integer, text, string, true/false (e.g., boolean), blob, binary, or decimal, as illustrative, non-limiting examples.

One or more of data structures 402-418 may be linked according to one or more rules (e.g., rules 116). For example, tags data structure 404, licenses data structure 406, qualifiers data structure 408, descriptions data structure 410, user properties data structure 412, stats data structure 414, and info sources data structure 416 may be linked to packages data structure 402. Additionally, info sources data structure 416 may be linked to sources data structure 418. The links may be single directional links or bi-directional links. Additionally, although illustrated as a single link, in some implementations a link may correspond to multiple links. Links between data structures may enable information from a linked data structure to be searched when searching information of a different data structure.

Figure 5A:
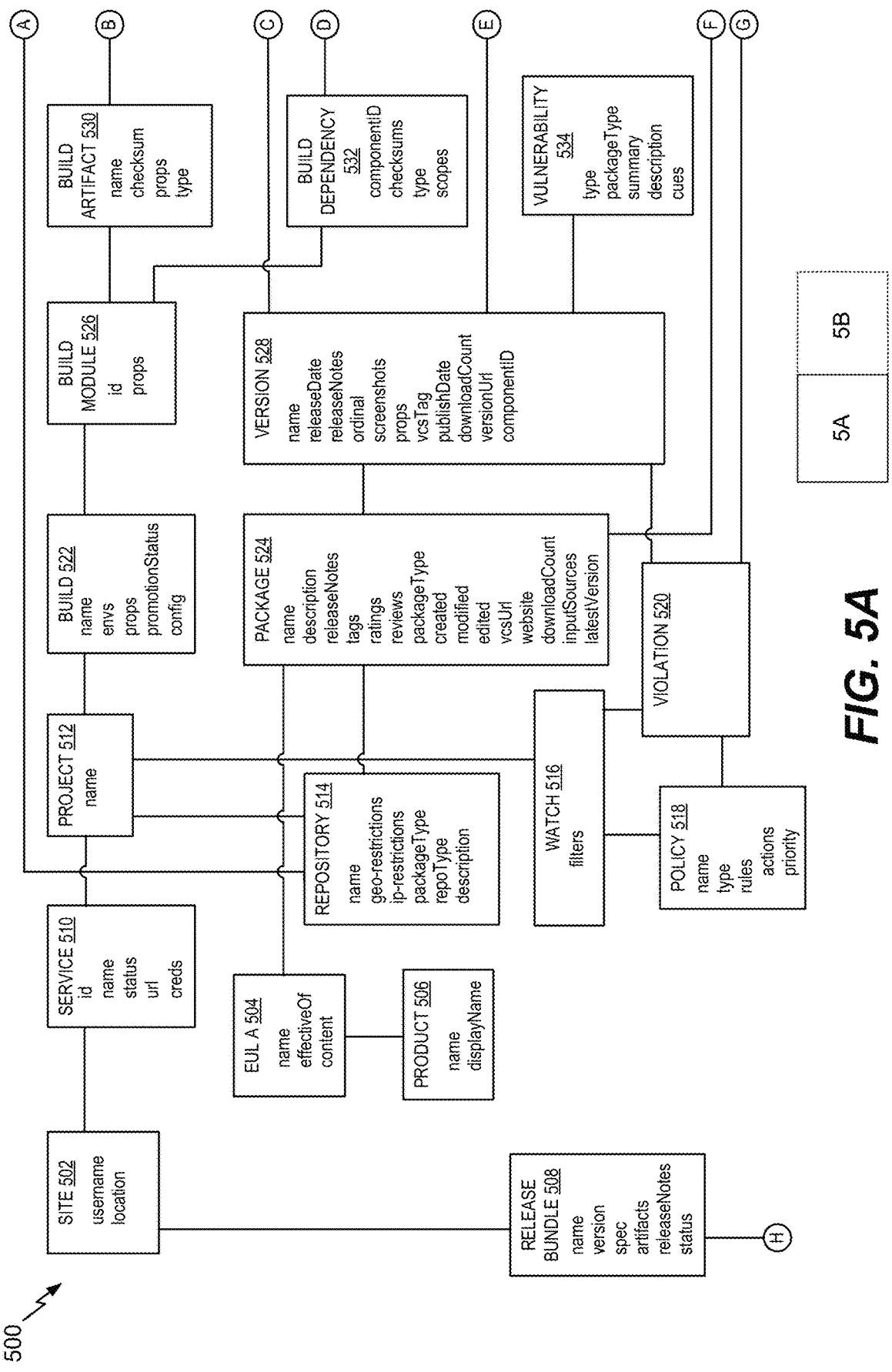
FIGS. 5A-5B illustrate a second example of a metadata model.
Figure 5B:
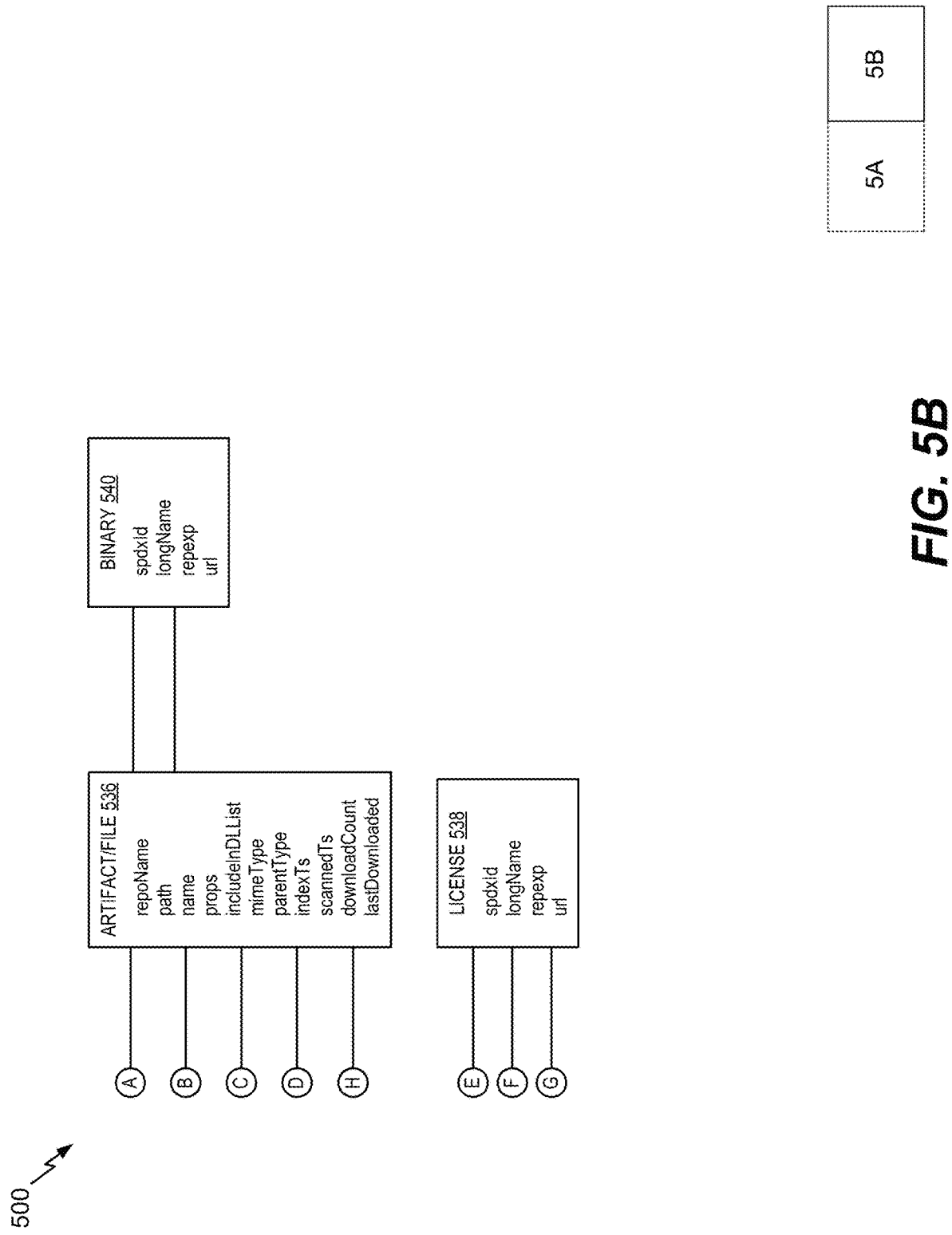

Referring to FIGS. 5A and 5B, a second example of a metadata model 500 is shown. Metadata model 500 includes a plurality of data structures. In a particular implementation, metadata model 500 includes a site data structure 502, an end-user license agreement ("EUL A") data structure 504, a product data structure 506, a release bundle data structure 508, a service data structure 510, a project data structure 512, a repository data structure 514, a watch data structure 516, a policy data structure 518, a violation data structure 520, a build data structure 522, a package data structure 524, a build module data structure 526, a version data structure 528, a build artifact data structure 530, a build dependency data structure 532, a vulnerability data structure 534, an artifact/file data structure 536, a license data structure 538, and a binary data structure 540. In other implementations, metadata model 500 may include fewer data structures or more data structures as shown in FIGS. 5A and 5B.

Each of the data structures 502-540 include one or more fields and contain information. For example, site data structure 502 may include a username field ("username") and a location field ("location"). As another example, end-user license agreement data structure 504 may include a name field ("name"), an effective of date field ("effectiveOf"), and a content field ("content"). As another example, release bundle data structure 508 may include a name field ("name"), a versions field ("version"), a specification field ("spec"), an artifacts field ("artifacts"), a release notes field ("releaseNotes"), and a status field ("status"). Other data structures include other fields, as illustrated in FIGS. 5A and 5B. In other implementations, data structures 502-540 may include fewer than or more than (or different) fields than those illustrated in FIGS. 5A and 5B. Additionally, each field is associated with a corresponding data type, such as an integer, text, string, boolean, blob, binary, or decimal, as illustrative, non-limiting examples.

One or more of data structures 502-540 may be linked according to one or more rules (e.g., rules 116). For example, site data structure 502 may be linked to service data structure 510 and to release bundle data structure 508. End-user license agreement data structure 504 may be linked to product data structure 506 and to package data structure 524. Product data structure 506 may be linked to end-user license agreement data structure 504. Release bundle data structure 508 may be linked to site data structure 502 and artifact/file data structure 536. Service data structure 510 may be linked to site data structure 502 and project data structure 512. Project data structure 512 may be linked to service data structure 510, repository data structure 514, watch data structure 516, and build data structure 522. Repository data structure 514 may be linked to project data structure 512, package data structure 524, and artifact/file data structure 536. Watch data structure 516 may be linked to project data structure 512, policy data structure 518, and violation data structure 520. Policy data structure 518 may be linked to watch data structure 516 and violation data structure 520. Violation data structure 520 may be linked to watch data structure 516, policy data structure 518, version data structure 528, vulnerability data structure 534, and license data structure 538. Build data structure 522 may be linked to project data structure 512 and build module data structure 526. Package data structure 524 may be linked to end-user license agreement data structure 504, repository data structure 514, version data structure 528, and license data structure 538. Build module data structure 526 may be linked to build data structure 522, build artifact data structure 530, and build dependency data structure 532. Version data structure 528 may be linked to violation data structure 520, package data structure 524, vulnerability data structure 534, artifact/file data structure 536, and license data structure 538. Build artifact data structure 530 may be linked to build module data structure 526 and artifact/file data structure 536. Build dependency data structure 532 may be linked to build module data structure 526 and to artifact/file data structure 536. Vulnerability data structure 534 may be linked to violation data structure 520 and version data structure 528. Artifact/file data structure 536 may be linked to repository data structure 514, build artifact data structure 530, version data structure 528, build dependency data structure 532, release bundle data structure 508, and binary data structure 540. License data structure 538 may be linked to version data structure 528, package data structure 524, and violation data structure 520. The links may be single directional links or bi-directional links. Additionally, although illustrated as a single link, in some implementations a link may correspond to multiple links. Links between data structures may enable information from a linked data structure to be searched when searching information of a different data structure.

Figure 6:
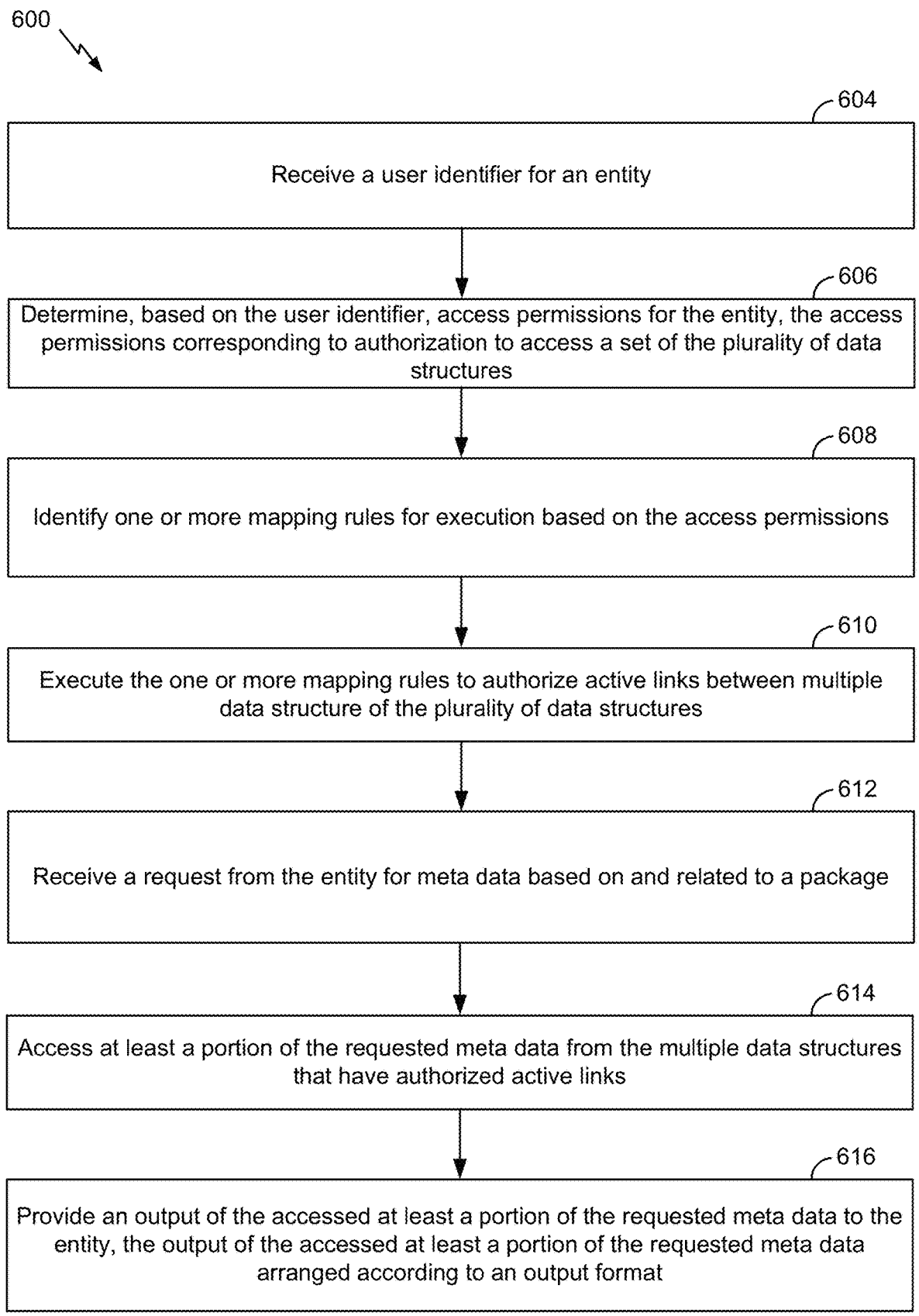
FIG. 6 is a flow diagram of an example of a method for operating a metadata server including package management including development and deployment of software, the method comprising.

FIG. 6 is flow diagram of a method for operating a metadata server including package management including development and deployment of software. The method of FIG. 6 may be stored in a computer-readable storage medium as instructions that, when executed by one or more processors, cause the one or more processors to perform the operations of the method (e.g., 600). For example, method 600 may be performed by repository server 110, server 168, processor 250 (e.g., manager 252), server 340, or processor 342.

In some implementations, the metadata server stores a database model including a plurality of data structures each including one or more entries of multiple data objects, a set of mapping rules defining links between different data structures of the plurality of data structures, and a set of operation rules for executing operations on the database model. The database model may include a strong type model. Additionally, or alternatively, the plurality of data structures may include a package data structure, a version data structure, a vulnerability data structure, a licensing information data structure, a build information data structure, and a file-level information data structure. For example, the package data structure may include or correspond to packages data structure 402 or package data structure 524. The version data structure may include or correspond to version data structure 528, the vulnerability data structure may include or correspond to vulnerability data structure 534, the licensing information data structure may include or correspond to licenses data structure 406 or license data structure 538, or a combination thereof. The build information data structure may include or correspond to project data structure 512, build data structure 522, build module data structure 526, build artifact data structure 530, or a combination thereof. The file-level information data structure may include or correspond to artifact/file data structure 536.

In some implementations, the package data structure may be directly linked to the version data structure, the vulnerability data structure, the licensing information data structure, the build information data structure, the file-level information data structure, or a combination thereof, as illustrative, non-limiting examples. The package data structure may be accessible to an entity independent of the access permissions.

At 604, method 600 includes receiving a user identifier for an entity. For example, the entity may include or correspond to entity 150 (e.g., 150*a*) or entity device 310. At 606, method 600 includes determining, based on the user identifier, access permissions for the entity, the access permissions corresponding to authorization to access a set of the plurality of data structures. For example, the plurality of data structure may include or correspond to metadata model 114. To illustrate, the database model may include a plurality of data structures which each include one or more entries of multiple data objects, such as metadata objects. The access permissions may include or correspond to credentials 232.

At 608, method 600 includes identifying one or more mapping rules for execution based on the access permissions. For example, the one or more mapping rules may include or correspond to rules 116. To illustrate, a set of mapping rules (e.g., one or more mapping rules) may define links between different data structures of the plurality of data structure. At 610, method 600 further includes executing the one or more mapping rules to authorize active links between multiple data structure of the plurality of data structures. For example, manager 252 may identify one or more data structures that the entity is authorized to access.

At 612, method 600 further includes receiving a request from the entity for metadata based on and related to a package. For example, the request may include or correspond to request 152, or query 330. In some implementations, the request is received in real-time. At 614, method 600 further includes accessing at least a portion of the requested metadata from the multiple data structures that have authorized active links. For example, a set of operation rules for executing operations on the data model may be accessed and executed to obtain the requested metadata or a portion thereof. To illustrate, the set of operation rules are executed to determine the access permissions and to identify the one or more mapping rules for execution.

At 616, method 600 further includes providing an output of the accessed at least a portion of the requested metadata to the entity, the output of the accessed at least a portion of the requested metadata arranged according to an output format. For example, the output may include or correspond to response information 336. In some implementations, the output is provided in real-time. The output may include information from multiple data structures of the plurality of data structures. Additionally, or alternatively, the output format may define an ordered arrangement of the metadata. The output may include, for each version of a package, build information, vulnerability information, or a combination thereof, as illustrative, non-limiting examples.

In some implementations, method 600 also includes determining user access permissions for a user corresponding to the user identifier. The user access permission for the user may be different from the access permissions for the entity. For example, the user access permission may be more restrictive than the access permissions for the entity. To illustrate, an entity may initiate multiple builds, such as a first build (named "Build 1") and a second build (named "Build 2"). Access permissions of users may be set such that users working on Build 1 have access to a package data structure, a version data structure, and one or more other data structures that are related to Build 1, and users working on Build 2 have to a package data structure, a version data structure, and one or more other data structures that are related to Build 2. Additionally, or alternatively, determining the access permissions for the entity may include identifying one or more active licenses corresponding to the entity, identifying one or more permissions corresponding to the user identifier, or a combination thereof. The one or more active licenses may include a first license for a service entity configured to access the database model to perform vulnerability analysis queries on packages based on one or data structures, a second license for a universal artifact repository, or both. The one or more active licenses may be determined based on metadata included in a data structure, such as the licenses data structure 406 or the license data structure 538, as illustrative, non-limiting examples.

In some implementations, method 600 includes receiving a second request from the entity. The second request may include a request selected from the group consisting of download, upload, create, build, delete, replace, update, query, list, and deploy.

In some implementations, the plurality of data structures include a package data structure. For example, the package data structure may include or correspond to packages data structure 402 or package data structure 524. The package data structure may include multiple data objects that each include a package identifier, a type, a name, a qualifier, a description, a website universal resource locator (URL), created information, license information, modified information, latest version information, version information, a download count, a follower count, a rating, tags, user properties, package information sources, or a combination thereof, as illustrative, non-limiting examples. Additionally or alternatively, the plurality of data structures may include a version data structure including package. For example, the version data structure may include or correspond to version data structure 528. The version data structure may include specific immutable information. Additionally, or alternatively, the version data structure may include a name, a package identifier, licenses, release information, and a repository location. Additionally, or alternatively, the plurality of data structures may include a file data structure, a vulnerability data structure, a package information source data structure, a package type data structure, a read me data structure, a version release notes data structure, or a combination thereof, as illustrative, non-limiting examples.

In some implementations, for each package having multiple versions, a single version of the package is designated as a primary package and each other version of the package is designated as a secondary package. The one or more mapping rules, when executed, may be applied to the primary package based on the access permissions. If the primary package is determined to be accessible based on the access permissions, the one or more mapping rules may be applied to each secondary package. Alternatively, if the primary package is determined to be inaccessible based on the access permissions, the one or more mapping rules may be not applied to each secondary package. In some implementations, the primary package corresponds to a package data structure. Additionally, or alternatively, each secondary package may correspond to a version data structure which is linked to the package data structure. Vulnerability information for each secondary package may correspond to a vulnerability data structure which is linked to the version data structure. For example, the vulnerability data structure may include or correspond to vulnerability data structure 534.

In some implementations, method 600 includes, in response to the request, generating, based on the set of operation rules, a search query operation corresponding to a package identifier format that includes a package type field. Additionally, or alternatively, method 600 may include sending, to the entity (or a user thereof), one or more search options. For example, the one or more search options may include or correspond to a package search or a version search. In some such implementations, the request may correspond to a selection of at least one of the one or more search options.

In some implementations, method 600 includes sending, to the entity, one or more search options corresponding to a package search. The one or more search options may include a package name, a package type, a version, a repository name, a checksum, a keyword tag, a description, or a combination thereof, as illustrative, non-limiting examples. In some such implementations, the request may correspond to a selection of at least one of the one or more search options. Additionally, or alternatively, the output of the accessed at least a portion of the requested metadata may include the package name, a number of repositories, a name of one or more repositories, a number of downloads, a number of versions, a last modified indicator, one or more keyword tags, a description, license information, a checksum, release notes information, a rating indicator, review information, an owner, or a combination thereof, as illustrative, non-limiting examples.

In some implementations, method 600 includes sending, to the entity, one or more search options corresponding to a version search. The one or more search options may include a package name, a package type, a version name, a repository name, a checksum, a keyword tag, a description, or a combination thereof, as illustrative, non-limiting examples. In some such implementations, the request may correspond to a selection of at least one of the one or more search options. Additionally, or alternatively, the output of the accessed at least a portion of the requested metadata may include a version name, a repository name, a last modified indicator, download information, a manifest, one or more keywords, one or more properties, one or more dependencies, license information, a description, a size, one or more security vulnerabilities, one or more licenses vulnerabilities, a component identifier, a release date, release notes, a publish date, a nearest upstream version, a closest upstream version with no vulnerabilities, or a combination thereof, as illustrative, non-limiting examples.

In some implementations, the method 600 includes, for each received request, executing the set of operation rules to generate event data. The method 600 may also include initiating storage of one or more portions of the event data at one or more data structures of the plurality of data structures.

In some implementations, the method 600 may include performing one or more operations, such as creating a package including one or more fields, reading a package by one or more fields (e.g., a name field, a package ID field (pkgid), etc.), filtering one or more fields of a read package, updating one or more fields of a packages, deleting a package (e.g., by name), or a combination thereof. Additionally, or alternatively, the method 600 may including displaying or initiating display of an output based on or corresponding to the one or more operations. To illustrate, information to complete an operation or information indicating completion of an operation may be output to a user or entity.

In some implementations, the method 600 may execute one or more APIs. In some implementations, the one or more APIs may correspond to operations associated with one or more packages, one or more versions, or a combination thereof. To illustrate, the one or more APIs may include a get packages API (to list all packages), a post package API (to create a package), a get package API (to receive information for a specific package based on a package id (pkgid)), a deleted package API (to delete a package by pkgid), a put package API (to replace a package by pkgid), a patch package API (to update a package by pkgid), a get version API (to list all versions), a post version API (to create a version), a get version API (to received information for a version by version name), a delete version API (to delete a version by version name), a put version API (to replace a version by version name), a patch version API (to update a version by version name), or a combination thereof, as illustrative, non-limiting examples. In to execute at least one of the one or more APIs, the method 600 may include receiving one or inputs from a user or entity, such as a pkgid or a version name.

In some implementations, the method 600 includes performing a package search (e.g., for native npm, Docker, or general) and/or a version search operation, such as on a package level (e.g., for native npm, Docker, or general). The package level search may utilize or be based on metadata (e.g., 220, 348), a metadata model 114, one or more data structures, or a combination thereof. In some implementations, the package search may be based on a package name, a version name (e.g., a/docker tag), a repository, a checksum, a qualifier (for npm), a tag (e.g., a keyword for npm or a label), a description, a package type, or a combination thereof, as illustrative, non-limiting examples. Based on performance of the package search, the method 600 may include providing an output that includes a package name, one or more repositories (e.g., number and/or name of repositories), a number of downloads, a number of versions, last modified information, one or more tags (e.g., keywords for npm), a description, license information, a version, a checksum, release notes, a rating, a review, a package type, last update information, Vsc_url information, a website, an owner, a latest version identifier, a download count, or a combination thereof, as illustrative, non-limiting examples.

Additionally, or alternatively, the version level search may utilize or be based on metadata (e.g., 220, 348), a metadata model 114, one or more data structures, or a combination thereof. In some implementations, the package search may be based on a version/tag name, a package name, a version name, a repository, a tag (e.g., a keyword for npm or label), a digest (for docker), a checksum, a description, a package type, or a combination thereof, as illustrative, non-limiting examples. Based on performance of the version search, the method 600 may include providing an output that includes a version/tag name, a repository, last modified information, downloads (e.g., a count), digest (e.g., for docker), a view manifest (e.g., for docker), one or more keywords (e.g., for npm), a version name (e.g.,/docker tag), a tag (e.g., a label), one or more properties, one or more dependencies, a license, a description, a size, one or more security vulnerabilities, one or more license vulnerabilities, a component ID, a release date, a release note, an ordinal, a screenshot, a VCS tag, a publish date, a logo/image, or a combination thereof, as illustrative, non-limiting examples. To illustrate, the package level search and/or the version level search may be performed on one or more fields of repository data structure 514, package data structure 524, version data structure 528, artifact/file data structure 536, binary data structure 540, build artifact data structure 530, project data structure 512, build module data structure 526, or a combination thereof, as illustrative, non-limiting examples.

In some implementations, executing a get packages API (to list all packages) may include providing an output associated with the following illustrative model:

```
{
  "results": [
    {
      "pkgid": "string",
      type": "string",
      "name": "string",
      description": "string",
      "website_url": "string",
      "vcs_url": "string",
      issues_url": "string",
      "created": 0,
      "modified": 0,
      "edited": 0,
      "latest_version": "string",
      respects_semver": true,
      "downloads_count": 0,
      "follower_count": 0,
      "rating": 0,
      "versions": [
        {
          "pkgid": "string",
          "name": "string",
          "created": 0,
          ordinal": 0,
          "downloads_count": 0,
          "licenses": [
            {
              "name": "string",
            }
          ]
        }
      ]
    }
  ]
}
```

In some implementations, executing a post package API (to create a package) may include providing an output associated with the following illustrative model:

```
{
  "pkgid": "string",
  "type": "string",
  "name": "string",
  description": "string",
  "website_url": "string",
  "vcs_url": "string",
  "issues_url": "string",
  "created": 0,
  "modified": 0,
  "edited": 0,
  "latest_version": "string",
  "respects_semver": true,
  "downloads_count": 0,
  "follower_count": 0,
  "rating": 0,
  "versions": [
    {
      "pkgid": "string",
      "name": "string",
      "created": 0,
      "ordinal": 0,
      "downloads_count": 0,
      "licenses": [
        {
          "name": "string",
          "description": "string",
          "url": "string",
        }
      ]
    }
  ]
}
```

In some implementations, executing a get package API (to receive information for a specific package based on a package id (pkgid)) may include providing an output associated with the following illustrative model:

```
{
  "pkgid": "string",
  "type": "string",
  "name": "string",
  "description": "string",
  "website_url": "string",
  "vcs_url": "string",
  "issues_url": "string",
```

```
"created": 0,
"modified": 0,
"edited": 0,
"latest_version": "string",
"respects_semver": true,
"downloads_count": 0,
"follower_count": 0,
"rating": 0,
"versions": [
    {
        "pkgid": "string",
        "name": "string",
        "created": 0,
        "ordinal": 0,
        "downloads_count": 0,
        "licenses": [
            {
                "name": "string",
                "description": "string",
                "url": "string",
            }
        ]
    }
  ]
}
```

In some implementations, executing a patch package API (to update a package by pkgid) may include providing an output associated with the following illustrative model:

```
{
    "pkgid": "string",
    "type": "string",
    "name": "string",
    "description": "string",
    "website_url": "string",
    "vcs_url": "string",
    "issues_url": "string",
    "created": 0,
    "modified": 0,
    "edited": 0,
    "latest_version": "string",
    "respects_semver": true,
    "downloads_count": 0,
    "follower_count": 0,
    "rating": 0,
    "versions": [
        {
            "pkgid": "string",
            "name": "string",
            "created": 0,
            "ordinal": 0,
            "downloads_count": 0,
            v"licenses": [
                {
                    "name": "string",
                    "description": "string",
                    "url": "string",
                }
            ]
        }
      ]
}
```

Thus, method 600 describes operation of a metadata server to manage and maintain metadata. For example, a metadata model and one or more sets of rules may be used to enable efficient access to metadata in real time. The metadata may be utilized as part of package management including development and deployment of software. By maintaining the metadata according to the metadata model and the one or more sets of rules as described herein, the metadata may be stored without unnecessary duplication of data. Additionally, the metadata of multiple data structures may be obtained based on a single search or query and may be presented in a structured manner. Accordingly, method 600 provides improved operation of the system by enabling non-duplicative storage of metadata, efficient access of the stored data, customization of access rights for different users/entities, and presentation of data aggregated from multiple data structures.

The method of FIG. 6 may be stored in a computer-readable storage medium as instructions that, when executed by one or more processors, cause the one or more processors to perform the operations of the method (e.g., 600). In some such implementations, method(s) also includes generating one or more graphical user interfaces (GUIs) via which the options for corrective actions, the identification of the particular file that poses the risk, the risk posed by the particular file, or a combination thereof, are displayed.

Figure 7:
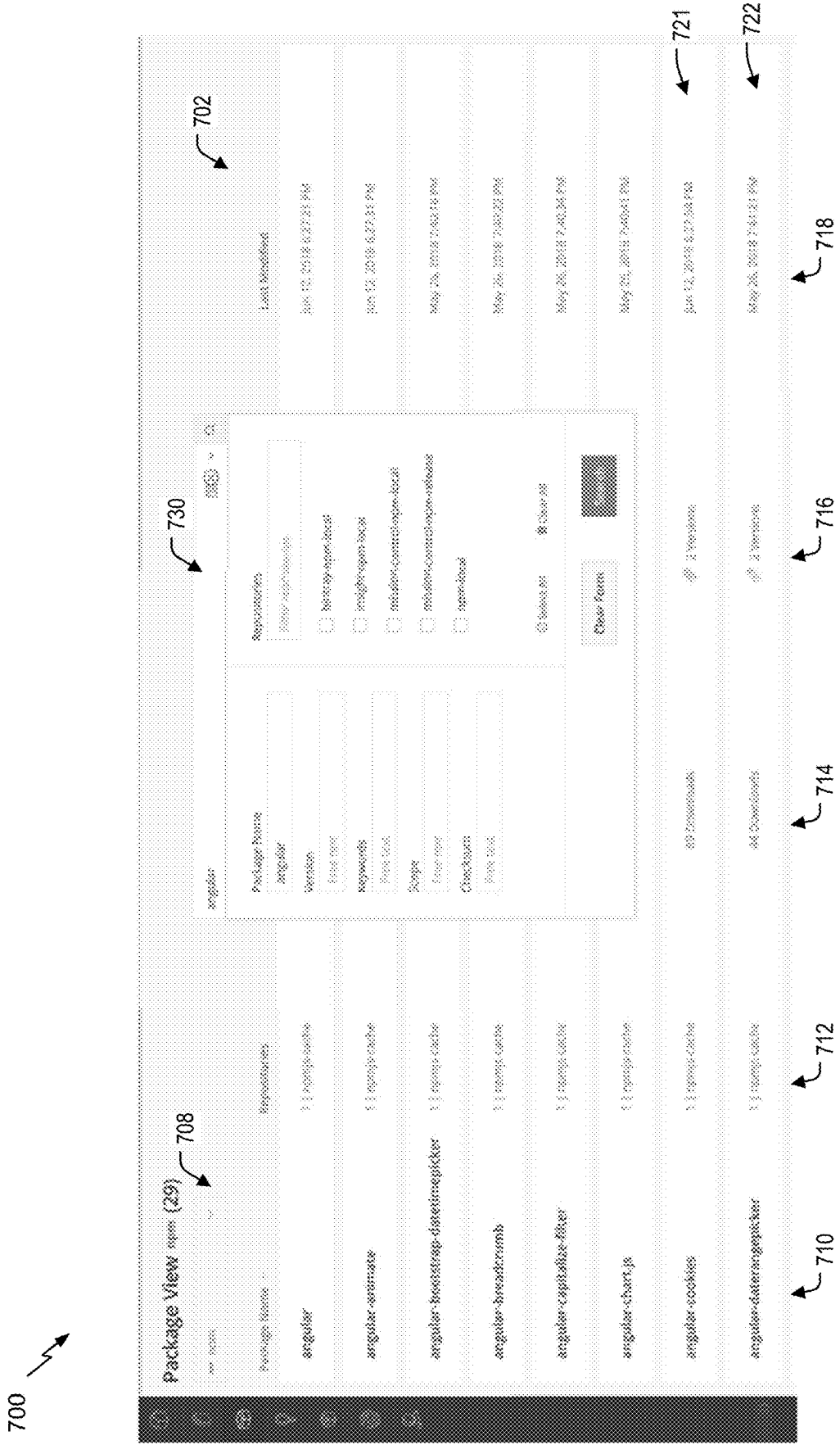
FIG. 7 is an example of an output and search options.
Figure 8:
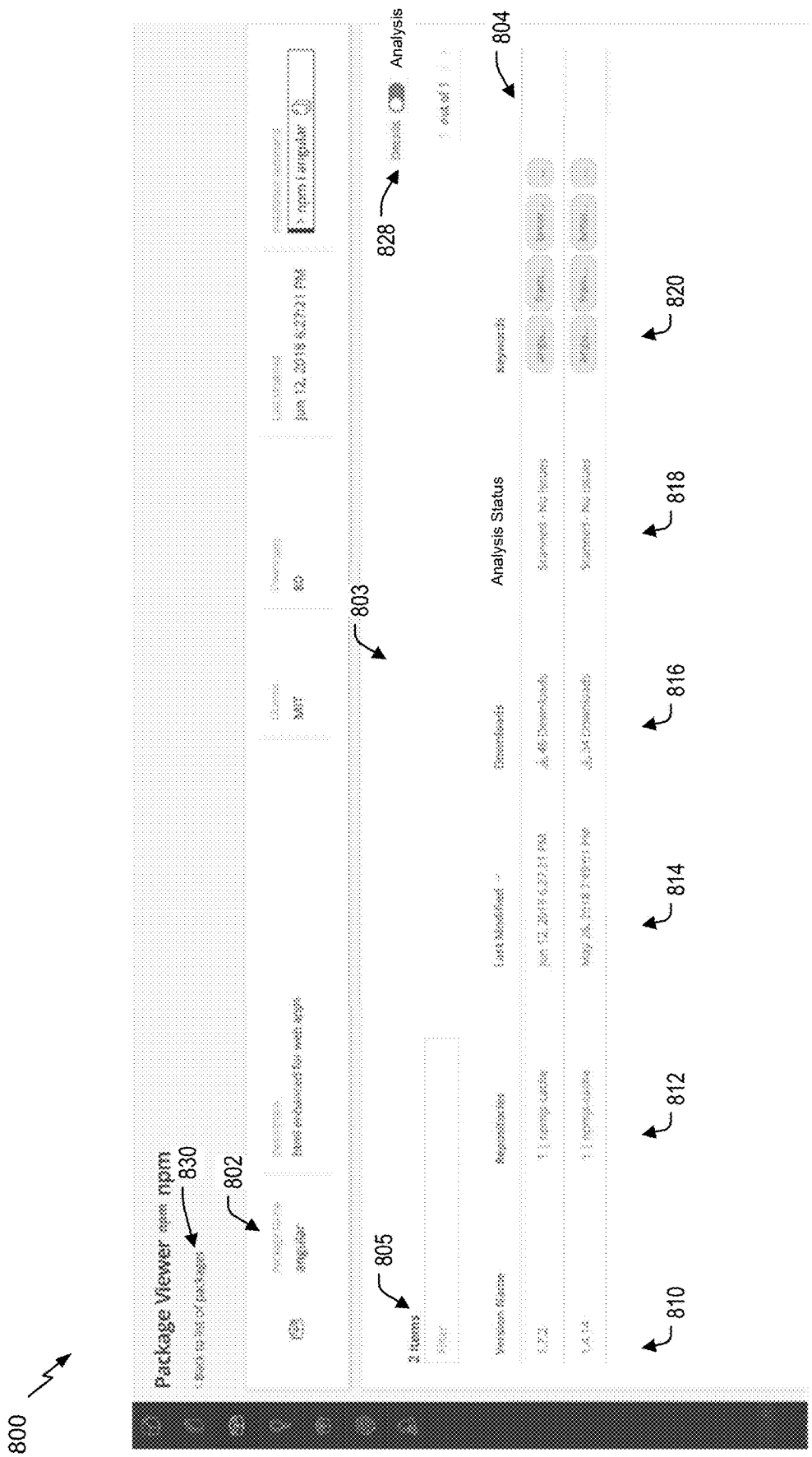
FIG. 8 is an example of an output showing multiple versions of a package.
Figure 9:
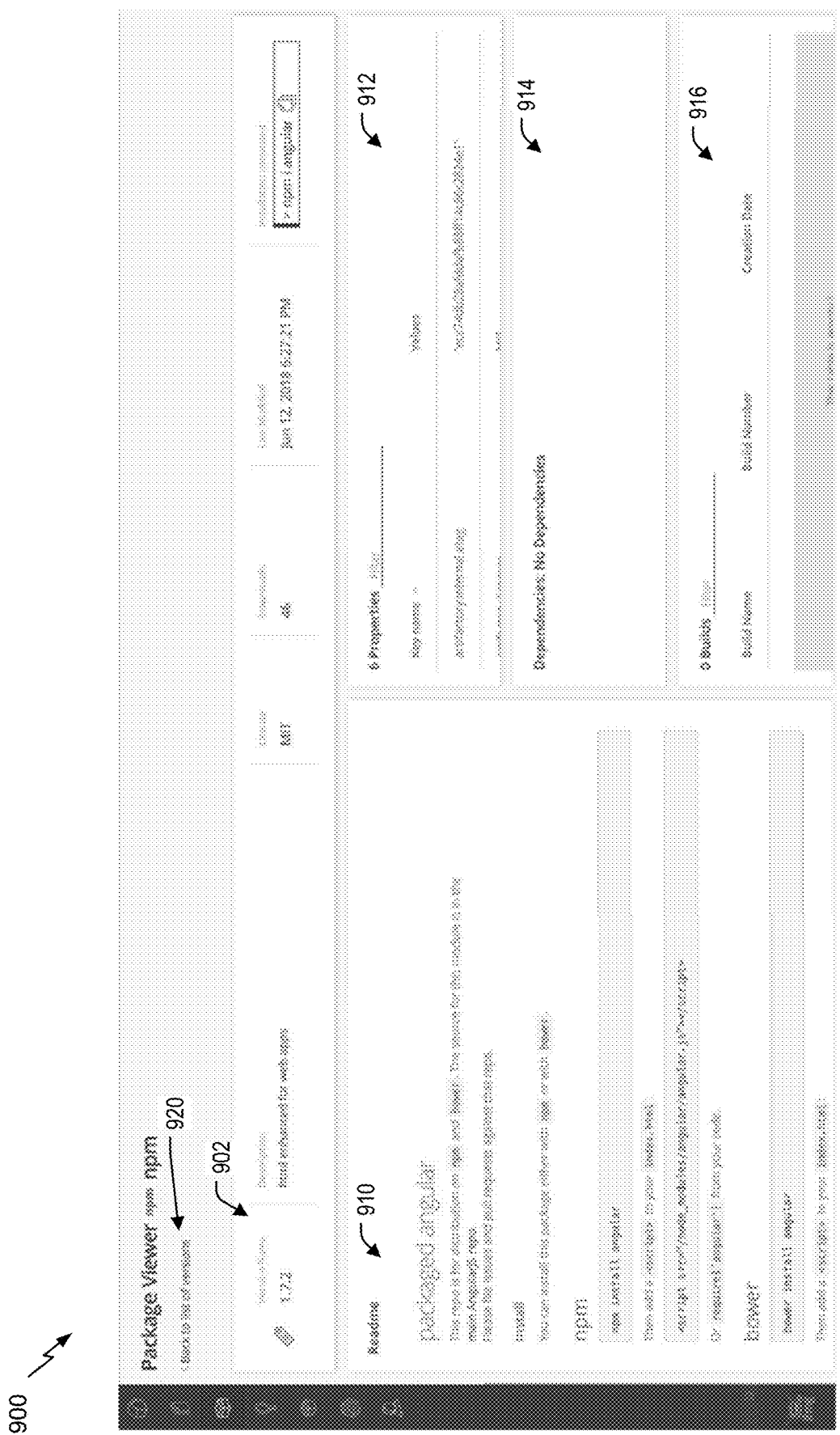
FIG. 9 is an example of an output showing information associated with a version of a package.

Referring to FIGS. 7-9, one or more views provided by the system 100, 200, or 300 are shown. One or more of the views may include or correspond to a graphical user interface (GUI) generated by server 110 (e.g., one or more processors 250 or 342), server 168, or server 340 and presented by a display device, such as a display device of entity 150, 150a, 150b, or 310. Additionally, or alternatively, interactions (e.g., input selections) with the views may be initiated by entity 150, 150a, 150b, or 310 and communicated to server 110, 168, or 340 (e.g., one or more processors 250 or 342), and operations/functions to present and/or modify the views may be performed by server 110, 168, or 340 (e.g., one or more processors 250 or 342) and communicated to entity 150, 150a, 150b, or 310. In some implementations, the one or more views may be initiated or generated based on execution of application 214 by manager 252 (or another module).

Referring to FIG. 7, a view associated with an output and search options is shown and designated 700. View 700 may display an output of a list of packages 702 and a search selection portion 730. For example, list of packages 702 includes one or more entries. Additionally, each entry includes information presented in an output format, such as fields or columns, as illustrative, non-limiting examples. It is noted that one or more entries may include information, such as metadata (e.g. 220), from metadata model 114. For example, the information may include metadata aggregated from multiple data structures of metadata model 114. To illustrate, an entry may include metadata from repository data structure 514, package data structure 524, version data structure 528, vulnerability data structure 534, or a combination thereof, as illustrative, non-limiting examples. Additionally, or alternatively, the information presented in view 700 may comply with rules 116 or one or more access permissions for a user and/or entity for which view 700 is presented.

As shown in view 700, the fields of the entries include a package name field 710, a repository field 712, a number of downloads field 714, a number of versions field 716, and a last modified field 718. To illustrate, a first entry 721 includes angular-cookies in package name field 710, an identification of 1 repository identified as npmjs-cache in repository field 712, 89 downloads indicated in number of downloads field 714, two versions in number of versions field 716, and a date and/or time in last modified field 718. As another example, a second entry 722 includes angular-daterangepicker in package name field 710, an identification of 1 repository identified as npmjs-cache in repository field 712, 44 downloads indicated in number of downloads field 714, two versions in number of versions field 716, and a date and/or time in last modified field 718. It is noted that the versions field 716 includes a link (shown as a tag) that causes a view of a list of versions for an entry based on selection of the link. A view of the list of versions may be the same as or similar to examples described with reference to FIG. 8 or 9. For example, FIG. 8 may be presented for a single version or multiple versions and FIG. 9 may be presented for a single version.

The list of packages 702 may be displayed based on or in response to a request by a user or entity to display one or more packages, such as all packages or a portion of a plurality of packages. For example, view 700 may be associated with a "Package View" requested by the user in which a list, or a portion of a list, of all packages is accessible to a user. The view 700 may include a selectable option 708, such as a drop down menu, that enables the user to select a category, such a repository or package type. To illustrate, selectable option 708 may include a drop down menu to filter the list. As shown, selectable option 708 is set to "npm" (node package manager) and list of packages 702 includes packages that correspond to a npm repository.

The search selection portion 730 may include one or more search fields, a drop down menu, a search form, one or more selectable options or buttons, a select all option, a clear all option, a clear form option, a search option, the like, or a combination thereof, as illustrative, non-limiting examples. As shown in view 700, search selection portion includes a search field and, optionally, a drop down form. The drop down form includes multiple fields, such as a package name field, a version filed, a keywords field, a scope field, a checksum field, and a filter repositories filed. The drop down form also includes one or more pre-populated (or filtered) repository options. In some implementations, list of packages 702 may be searched or filtered based on search selection portion 730. An example of a result (or output) of such a search operation is described further herein at least with reference to FIG. 8.

Referring to FIG. 8, a view associated with an output showing multiple versions of a package is shown and designated 800. View 800 may display a package information portion 802 and a version information portion 803. It is noted that one or more entries may include information, such as metadata (e.g. 220), from metadata model 114. For example, the information may include metadata aggregated from multiple data structures of metadata model 114. To illustrate, an entry may include metadata from repository data structure 514, package data structure 524, version data structure 528, vulnerability data structure 534, or a combination thereof, as illustrative, non-limiting examples.

View 800 may be displayed based on or in response to a request by a user or entity to display one or more versions, such as all versions or a portion of a plurality of versions. For example, view 800 may be associated with a "Package/Version View" requested by the user in which a list, or a portion of a list, of all packages is accessible to a user. Additionally, or alternatively, the information presented in view 800 may comply with rules 116 or one or more access permissions for a user and/or entity for which view 800 is presented.

The package information portion 802 may include an entry with information, such as metadata (e.g., 220) associated with a package. For example, the entry may include fields that include corresponding metadata. As shown in view 800, package information portion 802 includes one or more fields, such as a package name field, a description field, a license field, a number of downloads field, a last modified field, and an installation command field, as illustrative, non-limiting examples. To illustrate, the entry includes angular in the package name field, "html enhanced for web apps" in the description field, MIT in the license filed, 80 in the downloads field, a date and time in the last modified filed, and information or a link to an installation command for one or more versions of the package in the installation command filed. Further, the entry may include metadata from repository data structure 514, package data structure 524, version data structure 528, vulnerability data structure 534, license data structure 538, artifact/file data structure 536, binary data structure 540, or a combination thereof, as illustrative, non-limiting examples. Additionally, or alternatively, the information presented in package information portion 802 may comply with rules 116 or one or more access permissions for a user and/or entity for which the view 800 is presented.

Version information portion 803 includes a list of one or more entries 804, a filter or search option 805, and an information type display selector 828. Each of the one or more entries 804 includes information presented in an output format, such as fields or columns, as illustrative, non-limiting examples. As shown in view 800, the fields of the entries include a version name field 810, a repository field 812, a last modified field 814, a number of downloads field 816, an analysis status field 818, and a keywords field 820. To illustrate, a first entry includes 1.7.2 in version name field 810, an identification of 1 repository identified as npmjs-cache in repository field 812, a date and time in last modified field 814, 46 in number of downloads field 816, a scanned and no issues status in analysis status field 818, and multiple keywords in keywords field 820. It is noted that one or more version entries may include information, such as metadata (e.g. 220), from metadata model 114. For example, the information may include metadata aggregated from multiple data structures of metadata model 114. To illustrate, an entry may include metadata from repository data structure 514, package data structure 524, version data structure 528, vulnerability data structure 534, violation data structure 520, or a combination thereof, as illustrative, non-limiting examples. For example, analysis status field 818 may be populated based on vulnerability data structure 534. Additionally, or alternatively, the information presented as part of the one or more version entries in version information portion 803 may comply with rules 116 or one or more access permissions for a user and/or entity for which the view 800 is presented. In other implementations, the information presented as part of the one or more version entries in view version information portion 803 may not be restricted and may be presented independent of access permission of a user or entity. In some implementations, selection of one of the version entries may cause a new view, such as a view as described with reference to FIG. 9.

In some implementations, each entry of the one or more entries 804 may be selectable. Selection of a particular entry by a user or entity may change or update view 800 to present additional or different information corresponding to the selected entry, or may change a display format of view 800. For example, selection of a particular entry may cause a different view, such as a view as described further herein at least with reference to FIG. 9.

Filter or search option 805 may include one or more search fields, a drop down menu, a search form, one or more selectable options or buttons, a select all option, a clear all option, a clear form option, a search option, the like, or a combination thereof, as illustrative, non-limiting examples. Filter or search option 805 may be configured to search or filter one or more entries 804. For example, filter or search option 805 may be used to search or filter one or more entries 804 based on one or more of fields 810-820, metadata of one or more data structures of a metadata model (e.g., 114), or a combination thereof.

Information type display selector 828 may be configured to change a display format and/or information of version information portion 803. As shown in view 800, version information portion 803 displays detailed information for the one or more entries 804. Based on selection of analysis for information type display selector 828, view 800 may be updated or modified such that version information portion 803 displays analysis information. To illustrate, the analysis information may include one or more entries, such as an entry for each version number, that each include a version name field and one or more fields related to analysis information. The one or more fields related to the analysis information may include or correspond to metadata (e.g., 220) from versions data structure 528, vulnerability data structure 534, violation data structure 520, watch data structure 516, or a combination thereof, as illustrative, non-limiting examples. In some implementations, the analysis information may include data generated by analyzer 258.

It is noted that view 800 also includes a link 830 that causes view 800 to change to a list of packages. For example, the list of packages may include or correspond to the view 700 of FIG. 7.

Referring to FIG. 9, a view associated with an output showing information for a version of a package is shown and designated 900. View 900 may display one or more portions 902, 910, 912, 914, and 916 of information associated with the version. It is noted that the one or more of portions 902, 910, 912, 914, and 916 may include information, such as metadata (e.g. 220), from metadata model 114. For example, the information may include metadata aggregated from multiple data structures of metadata model 114. To illustrate, a portion may include metadata from repository data structure 514, package data structure 524, version data structure 528, vulnerability data structure 534, license data structure 538, artifact/file data structure 536, binary data structure 540, project data structure 512, build data structure 522, build module data structure 526, build artifact data structure 530, or a combination thereof, as illustrative, non-limiting examples.

View 900 may be displayed based on or in response to a request by a user or entity to display a version. For example, view 900 may be associated with a "Version View" requested by the user. Additionally, or alternatively, the information presented in view 900, or individual portions of view 900, may comply with rules 116 or one or more access permissions for a user and/or entity for which view 900 is presented. In other implementations, the information presented in view 900 may not be restricted and may be presented independent of access permissions of a user or entity.

The one or more portions may include a general information portion 902, a readme information portion 910, a properties information portion 912, a dependencies information portion 914, a builds information portion 916, or a combination thereof, as illustrative, non-limiting examples. General information portion 902 may include information, such as metadata (e.g., 220) associated with the version. For example, general information portion 902 may include fields that include corresponding metadata. As shown in view 900, general information portion 902 includes one or more fields, such as a version name field, a description field, a license filed, a number of downloads field, a last modified field, and an installation command field, as illustrative, non-limiting examples. In the example shown in FIG. 9, general information portion 902 includes 1.7.2 in the version name field, "html enhanced for web apps" in the description field, MIT in the license filed, 46 in the downloads field, a date and time in the last modified filed, and information or a link to an installation command for the version of the package in the installation command filed.

Readme information portion 910 may include information associated with a description and/or installation of the version. Properties information portion 912 may include one or more entries each having one or more fields. For example, the one or more fields may include a key name field and a values field. In some implementations, properties information portion 912 may include a filter or search option. The filter or search option may include one or more search fields, a drop down menu, a search form, one or more selectable options or buttons, a select all option, a clear all option, a clear form option, a search option, the like, or a combination thereof, as illustrative, non-limiting examples. The filter or search option may be configured to search or filter the one or more entries of properties information portion 912. Dependencies information portion 914 may include or indicate no dependencies or one or more packages, such as one or more builds, artifacts/files, binaries, or versions of a package that have a dependency to the version corresponding to view 900. Builds information portion 916 may include or indicate no builds or one or more builds that include the version corresponding to view 900.

It is noted that view 900 may also include a link 920 that causes view 900 to change to a list of versions of a package. For example, the list of versions may include or correspond to the view 800 of FIG. 8.

In some aspects, techniques for operating a metadata server for package management including development or deployment of software may include additional aspects, such as any single aspect or any combination of aspects described below or in connection with one or more other processes or devices described elsewhere herein. In some aspects, operating a metadata server for package management may include a system including at least one memory storing instructions and a database model including a plurality of data structures each including one or more entries of multiple data objects, a set of mapping rules defining links between different data structures of the plurality of data structure, and a set of operation rules for executing operations on the database model. The system further includes one or more processors coupled to the at least one memory. The one or more processors are configured to execute the instructions to cause the one or more processors to receive a user identifier for an entity and determine, based on the user identifier, access permissions for the entity. The access permissions correspond to authorization to access a set of the plurality of data structures. The one or more processors are further configured to execute the instructions to cause the one or more processors to identify one or more mapping rules for execution based on the access permissions and execute the one or more mapping rules to authorize active links between multiple data structures of the plurality of data structures. The one or more processors are further configured to execute the instructions to cause the one or more processors to receive a request from the entity for metadata based on and related to a package and access at least a portion of the requested metadata from the multiple data structures that have authorized active links. The one or more processors are also configured to execute the instructions to cause the one or more processors to provide an output of the accessed at least a portion of the requested metadata to the entity. The output of the accessed at least a portion of the requested metadata is arranged according to an output format.

In some implementations, the system includes one or more devices, one or more modules, or a combination thereof. For example, one or more operations described with reference to the system may be performed by the one or more devices, the one or more modules, or the combination thereof. In some implementations, the system may include at least one processor, and a memory coupled to the at least one processor. The at least one processor may be configured to perform operations described herein with respect to the system. In some other implementations, the system may include a non-transitory computer-readable medium having program code recorded thereon and the program code may be executable by a computer for causing the computer to perform operations described herein with reference to the system. In some implementations, the system may include one or more means configured to perform operations described herein. In some implementations, a method may include one or more operations described herein with reference to the system.

In a first aspect, to determine the access permissions for the entity, the one or more processors are further configured to execute the instructions to cause the one or more processors to identify one or more active licenses corresponding to the entity, identify one or more permissions corresponding to the user identifier, or a combination thereof.

In a second aspect, alone or in combination with the first aspect, the one or more active licenses include a first license for a service entity configured to access the database model to perform vulnerability analysis queries on packages based one or data structures, a second license for universal artifact repository, or both.

In a third aspect, alone or in combination with one or more of the first through second aspects, the one or more processors are further configured to execute the instructions to cause the one or more processors to determine user access permissions for a user corresponding to the user identifier.

In a fourth aspect, in combination with the third aspect, the user access permissions for the user are different from the access permissions for the entity.

In a fifth aspect, alone or in combination with one or more of the first through fourth aspects, the set of operation rules are executed to determine the access permissions.

In a sixth aspect, in combination with the fifth aspect, the set of operation rules are executed to identify the one or more mapping rules for execution.

In a seventh aspect, in combination with one or more of the first through sixth aspects, the one or more processors are further configured to execute the instructions to cause the one or more processors to receive a second request from the entity.

In an eighth aspect, in combination with the seventh aspect, the second request includes a request selected from the group consisting of download, upload, create, build, delete, replace, update, query, list, and deploy.

In a ninth aspect, alone or in combination with one or more of the first through eighth aspects, the database model includes a strong type model.

In a tenth aspect, alone or in combination with one or more of the first through ninth aspects, the plurality of data structures includes a package data structure.

In an eleventh aspect, in combination with the tenth aspect, the package data structure includes multiple data objects.

In a twelfth aspect, in combination with the eleventh aspect, the multiple data objects include a package identifier, a type, a name, a qualifier, a description, a website universal resource locator, created information, license information, modified information, latest version information, version information, a download count, a follower count, a rating, tags, user properties, package information sources, or a combination thereof.

In a thirteenth aspect, alone or in combination with one or more of the first through twelfth aspects, the plurality of data structures include a version data structure including package specific immutable information.

In a fourteenth aspect, in combination with the thirteenth aspect, the version data structure includes a name, a package identifier, license information, release information, a repository location, or a combination thereof.

In a fifteenth aspect, in combination with one or more of the thirteenth through fourteenth aspects, the plurality of data structures include a file data structure, a vulnerability data structure, a package information source data structure, a package type data structure, a read me data structure, a version release notes data structure, or a combination thereof.

In a sixteenth aspect, alone or in combination with one or more of the first through fifteenth aspects, the one or more processors are further configured to execute the instructions to cause the one or more processors to send, to the entity, one or more search options corresponding to a package search.

In a seventeenth aspect, in combination with the sixteenth aspect, the one or more search options include a package name, a package type, a version, a repository name, a checksum, a keyword tag, a description, or a combination thereof.

In an eighteenth aspect, in combination with the seventeenth aspect, the request corresponds to a selection of at least one of the one or more search options.

In a nineteenth aspect, in combination with one or more of the sixteenth through eighteenth aspects, the output of the accessed at least a portion of the requested metadata includes the package name, a number of repositories, a name of one or more repositories, a number of downloads, a number of versions, a last modified indicator, one or more keyword tags, a description, license information, a checksum, release notes information, a rating indicator, review information, an owner, or a combination thereof.

In a twentieth aspect, alone or in combination with one or more of the first through nineteenth aspects, the one or more processors are further configured to execute the instructions to cause the one or more processors to send, to the entity, one or more search options corresponding to a version search.

In a twenty-first aspect, in combination with the twentieth aspect, the one or more search options include a package name, a package type, a version name, a repository name, a checksum, a keyword tag, a description, or a combination thereof.

In a twenty-second aspect, in combination with the twenty-first aspect, the request corresponds to a selection of at least one of the one or more search options.

In a twenty-third aspect, in combination with one or more of the twentieth through twenty-second aspects, the output of the accessed at least a portion of the requested metadata includes a version name, a repository name, a last modified indicator, download information, a manifest, one or more keywords, one or more properties, one or more dependencies, license information, a description, a size, one or more security vulnerabilities, one or more licenses vulnerabilities, a component identifier, a release date, release notes, a publish date, a nearest upstream version, a closest upstream version with no vulnerabilities, or a combination thereof.

In a twenty-fourth aspect, alone or in combination with one or more of the first through twenty-third aspects, the output format defines an ordered arrangement of the metadata.

In a twenty-fifth aspect, alone or in combination with one or more of the first through twenty-fourth aspects, in response to the request, the one or more processors are further configured to execute the instructions to cause the one or more processors to generate, based on the set of operation rules, a search query operation corresponding to a package identifier format that includes a package type field.

In a twenty-sixth aspect, alone or in combination with one or more of the first through twenty-fifth aspects, for each package having multiple versions, a single package is designated as a primary package and each other package is designated as a secondary package.

In a twenty-seventh aspect, in combination with the twenty-sixth aspect, the one or more mapping rules, when executed, are applied to the primary package based on the access permissions.

In a twenty-eighth aspect, in combination with the twenty-seventh aspect, if the primary package is determined to be accessible based on the access permissions, the one or more mapping rules are applied to each secondary package.

In a twenty-ninth aspect, in combination with the twenty-seventh aspect, if the primary package is determined to be inaccessible based on the access permissions, the one or more mapping rules are not applied to each secondary package.

In a thirtieth aspect, alone or in combination with one or more of the twenty-sixth through twenty-ninth aspects, the primary package corresponds to a package data structure.

In a thirty-first aspect, in combination with the thirtieth aspect, each secondary package corresponds to a version data structure which is linked to the package data structure.

In a thirty-second aspect, in combination with the thirty-first aspect, vulnerability information for each secondary package corresponds to a vulnerability data structure which is linked to the version data structure.

In a thirty-third aspect, in combination with the thirty-second aspect, the package data structure is directly linked to the version data structure, the vulnerability data structure, the licensing information data structure, the build information data structure, the file-level information data structure, or a combination thereof.

In a thirty-fourth aspect, in combination with one or more of the thirtieth aspect through thirty-fourth aspects, the package data structure is accessible to the entity independent of the access permissions.

In a thirty-fifth aspect, alone or in combination with one or more of the first through thirty-fourth aspects, for each version of the package, the output includes build information, vulnerability information, or both.

In a thirty-sixth aspect, alone or in combination with one or more of the first through thirty-fifth aspects, for each received request, the one or more processors are further configured to execute the instructions to cause the one or more processors to execute the set of operation rules to generate event data.

In a thirty-seventh aspect, in combination with the thirty-sixth aspect, the one or more processors are further configured to execute the instructions to cause the one or more processors to initiate storage of one or more portions of the event data at one or more data structures of the plurality of data structures.

In a thirty-eighth aspect, alone or in combination with one or more of the first through thirty-seventh aspects, the request is received and the output is provided in real-time.

In a thirty-ninth aspect, alone or in combination with one or more of the first through thirty-eighth aspects, the output includes information from multiple data structures of the plurality of data structures.

Although one or more of the disclosed figures may illustrate systems, apparatuses, methods, or a combination thereof, according to the teachings of the disclosure, the disclosure is not limited to these illustrated systems, apparatuses, methods, or a combination thereof. One or more functions or components of any of the disclosed figures as illustrated or described herein may be combined with one or more other portions of another function or component of the disclosed figures. Accordingly, no single implementation described herein should be construed as limiting and implementations of the disclosure may be suitably combined without departing from the teachings of the disclosure.

The steps of a method or algorithm described in connection with the implementations disclosed herein may be included directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Although the present disclosure and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for operating a metadata server for package management including development and deployment of software, the method comprising:
   at a metadata server storing a database model including a plurality of data structures with entries of multiple data objects, a set of mapping rules each executable to define links between one or more data structures of the plurality of data structures, and a set of operation rules for executing operations on the database model, performing:
  receiving, by one or more processors, a user identifier for an entity;
  determining, by the one or more processors, access permissions for the entity, based on the user identifier;
  executing, by the one or more processors, one or more mapping rules of the set of mapping rules, the one or more mapping rules executed to authorize one or more active links between a set of data structures of the plurality of data structures that the entity is authorized to access, the one or more mapping rules selected by the one or more processors in accordance with the access permissions for the entity, the one or more active links enabling a search of the set of data structures based on a single search request from the entity;
  receiving, by the one or more processors, a search request from the entity for metadata related to a software package;
  searching, by the one or more processors, the set of data structures linked via the one or more active links to identify at least a portion of the metadata that the entity is authorized to access in response to the search request, the set of data structures linked via the one or more active links including one or more software package data structures of the plurality of data structures and one or more version data structures each associated with a corresponding mapping rule of the set of mapping rules that, when executed by the one or more processors, authorize one or more corresponding active links to the one or more software package data structures, the one or more software package data structures storing first metadata that indicates software package types of software packages represented by the one or more software package data structures, and the one or more version data structures storing second metadata that indicates one or more versions of the software packages represented by the one or more version data structures; and
  providing, by the one or more processors, an output including the identified portion of the metadata to the entity.

2. The method of claim 1, wherein the portion of the metadata includes a software package name, a number of repositories, a name of one or more repositories, a number of downloads, a number of versions, a last modified indicator, one or more keyword tags, a description, license information, a checksum, release notes information, a rating indicator, review information, an owner, or a combination thereof.

3. The method of claim 1, further comprising sending, to the entity and prior to receiving the search request, one or more search options corresponding to a software package search or a version search, wherein the one or more search options include a software package name, a software package type, a version name, a repository name, a checksum, a keyword tag, a description, or a combination thereof, and wherein the request corresponds to a selection of at least one of the one or more search options.

4. The method of claim 1, wherein the one or more software package data structures further comprise corresponding software package identifiers, names, and qualifiers, and the one or more version data structures further comprise corresponding software package-specific immutable information.

5. The method of claim 4, wherein each of the one or more software package data structures include a package type field that indicates a software package type of the corresponding software package data structure, the software package type comprising one of Bower, Chef, CocoaPods, Conan, Conda, CRAN, Debian, Docker, Git LFS, Go, Helm, Maven, npm, NuGet, Opkg, P2, PHP, Composer, Puppet, PyPI, RPM, RubyGems, SBT, Vagrant, and VCS.

6. The method of claim 5, wherein each of the one or more version data structures include software package-specific immutable information associated with the software package type indicated by the package type field of a linked software package data structure.

7. The method of claim 1, wherein determining the access permissions further comprises:
  determining, by the one or more processors, one or more active licenses corresponding to the entity, based on the access permissions for the entity; and
  identifying, by the one or more processors, the one or more mapping rules for execution based on the access permissions.

8. The method of claim 1, further comprising receiving a second search request from the entity, the second search request selected from the group consisting of download, upload, create, build, delete, replace, update, query, list, and deploy.

9. The method of claim 1, wherein the output includes, for each version of the software package, build information corresponding to the respective version of the software package and vulnerability information corresponding to the respective version of the software package.

10. The method of claim 1, further comprising, for each received search request:
  executing the set of operation rules to generate event data; and
  initiating storage of one or more portions of the event data at one or more data structures of the plurality of data structures.

11. A system for operating a metadata server for package management including development and deployment of software, the system comprising:
  at least one memory storing instructions and a database model including a plurality of data structures with entries of multiple data objects, a set of mapping rules each executable to define links between one or more data structures of the plurality of data structures, and a set of operation rules for executing operations on the database model; and
  one or more processors coupled to the at least one memory, the one or more processors configured to execute the instructions to cause the one or more processors to:
    receive a user identifier for an entity;
    determine access permissions for the entity, based on the user identifier;
    execute one or more mapping rules of the set of mapping rules, the one or more mapping rules executed to authorize one or more active links between a set of data structures of the plurality of data structures that the entity is authorized to access, the one or more mapping rules selected by the one or more processors in accordance with the access permissions for the entity, the one or more active links enabling a search of the set of data structures based on a single search request from the entity;

receive a search request from the entity for metadata based on and related to a software package;

search the set of data structures linked via the one or more active links to identify at least a portion of the metadata that the entity is authorized to access in response to the search request, the set of data structures linked via the one or more active links including one or more software package data structures of the plurality of data structures and one or more version data structures each associated with a corresponding mapping rule of the set of mapping rules that, when executed by the one or more processors, authorize one or more corresponding active links to the one or more software package data structures, the one or more software package data structures storing first metadata that indicates software package types of software packages represented by the one or more software package data structures, and the one or more version data structures storing second metadata that indicates one or more versions of the software packages represented by the one or more version data structures; and provide an output including the identified portion of the metadata to the entity.

12. The system of claim 11, wherein the database model comprises a strong type model.

13. The system of claim 11, wherein the one or more software package data structures further comprise corresponding descriptions, website uniform resource locators, created information, license information, modified information, latest version information, version information, download counts, follower counts, ratings, tags, user properties, software package information sources, or a combination thereof.

14. The system of claim 13, wherein the one or more version data structures further comprise corresponding file data structures, vulnerability data structures, software package information source data structures, read me data structures, version release notes data structures, or a combination thereof.

15. The system of claim 11, wherein:
the plurality of data structures further include a vulnerability data structure, a licensing information data structure, a build information data structure, and a file-level information data structure; and
the one or more software package data structures have authorized active links to the vulnerability data structure, the licensing information data structure, the build information data structure, the file-level information data structure, or a combination thereof, based on execution of the one or more mapping rules.

16. A non-transitory computer-readable storage medium storing instructions that, when executed by one or more processors, cause the one or more processors to perform operations for operating a metadata server for package management including development or deployment of software, the metadata server storing a database model including a plurality of data structures with entries of multiple data objects, a set of mapping rules each executable to define links between one or more data structures of the plurality of data structures, and a set of operation rules for executing one or more operations on the database model, the operations comprising:

receiving a user identifier for an entity;

determining access permissions for the entity, based on the user identifier;

executing one or more mapping rules of the set of mapping rules, the one or more mapping rules executed to authorize one or more active links between a set of data structures of the plurality of data structures that the entity is authorized to access, the one or more mapping rules selected by the one or more processors in accordance with the access permissions for the entity, the one or more active links enabling a search of the set of linked data structures based on a single search request from the entity;

receiving a search request from the entity for metadata based on and related to a software package;

searching the set of data structures linked via the one or more active links to identify at least a portion of the metadata that the entity is authorized to access in response to the search request, the set of data structures linked via the one or more active links including one or more software package data structures of the plurality of data structures and one or more version data structures each associated with a corresponding mapping rule of the set of mapping rules that, when executed by the one or more processors, authorize one or more corresponding active links to the one or more software package data structures, the one or more software package data structures storing first metadata that indicates software package types of software packages represented by the one or more software package data structures, and the one or more version data structures storing second metadata that indicates one or more versions of the software packages represented by the one or more version data structures; and providing an output including the identified portion of the metadata to the entity.

17. The non-transitory computer-readable storage medium of claim 16, wherein, for each software package having multiple versions, a single version of the software package is designated as a primary package and each other version of the software package is designated as a secondary package.

18. The non-transitory computer-readable storage medium of claim 16, wherein the output is provided according to an output format that defines an ordered arrangement of the identified portion of the metadata.

19. The non-transitory computer-readable storage medium of claim 16, wherein the operations further comprise determining user access permissions for a user corresponding to the user identifier, the user access permissions for the user being different from the access permissions for the entity.

* * * * *